(12) United States Patent
Liu

(10) Patent No.: US 12,542,478 B2
(45) Date of Patent: Feb. 3, 2026

(54) VOLTAGE REGULATION MODULE, CHARGING MODULE, AND CHARGING PILE

(71) Applicant: Huawei Digital Power Technologies Co., Ltd., Shenzhen (CN)

(72) Inventor: Yang Liu, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 828 days.

(21) Appl. No.: 17/827,454

(22) Filed: May 27, 2022

(65) Prior Publication Data

US 2022/0294340 A1 Sep. 15, 2022

Related U.S. Application Data

(63) Continuation of application No. PCT/CN2019/122182, filed on Nov. 29, 2019.

(51) Int. Cl.
*H02M 1/00* (2007.01)
*H02M 3/335* (2006.01)

(52) U.S. Cl.
CPC ....... *H02M 1/0077* (2021.05); *H02M 1/0083* (2021.05); *H02M 1/0074* (2021.05); *H02M 3/335* (2013.01)

(58) Field of Classification Search
CPC ............. H02M 1/0074; H02M 1/0077; H02M 1/0083; H02M 3/155; H02M 3/335
See application file for complete search history.

(56) References Cited

U.S. PATENT DOCUMENTS

| 5,943,223 | A | * | 8/1999 | Pond | ................ H02M 7/58 363/53 |
|---|---|---|---|---|---|
| 2010/0165679 | A1 | | 7/2010 | Lu et al. | |
| 2018/0152032 | A1 | * | 5/2018 | Götz | ................ H02J 7/0045 |
| 2018/0162229 | A1 | * | 6/2018 | Götz | ................ H02J 7/0042 |
| 2019/0181668 | A1 | | 6/2019 | Qiu | |
| 2019/0222129 | A1 | * | 7/2019 | Wang | ................ H02M 3/33571 |
| 2022/0209679 | A1 | * | 6/2022 | Yu | ................ H02M 7/068 |

FOREIGN PATENT DOCUMENTS

| CN | 101442259 A | 5/2009 |
|---|---|---|
| CN | 101777845 A | 7/2010 |
| CN | 103401466 A | 11/2013 |
| CN | 103427659 A | 12/2013 |

(Continued)

*Primary Examiner* — Fred E Finch, III
(74) *Attorney, Agent, or Firm* — Leydig, Voit & Mayer, Ltd.

(57) ABSTRACT

A voltage regulation module, a charging module, and a charging pile may be used to charge an electric vehicle, to regulate an output voltage in a wide range, and to implement seamless switching without power-off in a process of switching from a low-voltage output state to a high-voltage output state. The voltage regulation module includes a first DC/DC converter group and a second DC/DC converter group. Both a parallel circuit and a series circuit exist between the first DC/DC converter group and the second DC/DC converter group. In addition, a controllable switch group is disposed in each of the series circuit and the parallel circuit, and a semiconductor device group is connected in parallel with two terminals of each controllable switch group.

22 Claims, 5 Drawing Sheets

(56) References Cited

FOREIGN PATENT DOCUMENTS

| | | |
|---|---|---|
| CN | 105119334 A | 12/2015 |
| CN | 105914838 A | 8/2016 |
| CN | 205992857 U | 3/2017 |
| CN | 206195615 U | 5/2017 |
| CN | 207117287 U | 3/2018 |
| CN | 109274085 A | 1/2019 |
| CN | 109309450 A | 2/2019 |
| CN | 208638063 U | 3/2019 |
| DE | 10007546 A1 | 8/2000 |
| DE | 102007027902 A1 | 12/2008 |
| WO | 9919974 A2 | 4/1999 |
| WO | 2014141436 A1 | 9/2014 |

\* cited by examiner

VOLTAGE REGULATION MODULE, CHARGING MODULE, AND CHARGING PILE

CROSS-REFERENCE TO RELATED APPLICATIONS

This application is a continuation of International Application No. PCT/CN2019/122182, filed on Nov. 29, 2019, the disclosure of which is hereby incorporated by reference in its entirety.

TECHNICAL FIELD

This application relates to the field of charging technologies, and in particular, to a voltage regulation module, a charging module, and a charging pile.

BACKGROUND

In recent years, new energy vehicles such as a pure electric vehicle (Pure Electric Vehicle/Battery Electric Vehicle) and a hybrid electric vehicle (HEV) are vigorously developing. Accordingly, construction of a charging infrastructure such as a charging pile is also vigorously developing. The charging pile may fall into an alternating current charging pile and a direct current charging pile. The direct current charging pile has a large charging power, and may meet a fast charging requirement of an electric vehicle. A core component of the direct current charging pile is a charging module. The charging module is a high-frequency switch-mode power supply, and is used to convert alternating current power into direct current power that can be used to directly charge a battery. Currently, voltage distribution of a battery of an electric vehicle on the market vary greatly, and a voltage distribution range is wide. A voltage of a battery of a small passenger car is mainly distributed in a range of 300 volts to 500 volts, a voltage of a battery of a vehicle such as a bus is mainly distributed in a range of 550 volts to 700 volts, and voltages of batteries of some high-tier vehicles are in a range of 750 volts to 950 volts. Therefore, to meet charging requirements of different types of electric vehicles, an output voltage of the charging module needs to be regulated in a wide range.

Therefore, a charging module whose output voltage can be regulated in a wide range needs to be studied.

SUMMARY

Embodiments of this application provide a voltage regulation module, a charging module, and a charging pile. The voltage regulation module, the charging module, and the charging pile may regulate an output voltage in a wide range. In addition, when the voltage regulation module, the charging module, and the charging pile charge an electric vehicle or another device, power-off may be avoided in processes of switching from a low-voltage output state to a high-voltage output state and switching from the high-voltage output state to the low-voltage output state. The voltage regulation module, the charging module, and the charging pile may be described as follows:

According to a first aspect, a voltage regulation module is provided, including a first direct current-direct current (DC/DC) converter module, a second DC/DC converter module, a first controllable switch module, a second controllable switch module, a third controllable switch module, a first semiconductor device module, a second semiconductor device module, and a third semiconductor device module. An output negative terminal of the first DC/DC converter module is connected to an output positive terminal of the second DC/DC converter module by using the first controllable switch module. An output positive terminal of the first DC/DC converter module is connected to the output positive terminal of the second DC/DC converter module by using the second controllable switch module. The output negative terminal of the first DC/DC converter module is connected to an output negative terminal of the second DC/DC converter module by using the third controllable switch module. The first semiconductor device module is connected in parallel between two terminals of the first controllable switch module. The second semiconductor device module is connected in parallel between two terminals of the second controllable switch module. The third semiconductor device module is connected in parallel between two terminals of the third controllable switch module.

The voltage regulation module may be disposed in a charging module, and is configured to: regulate an output voltage, and externally output a voltage.

When the first DC/DC converter module and the second DC/DC converter module are in a series conducted state, the output positive terminal of the first DC/DC converter module is an external output positive terminal of the entire voltage regulation module, and the output negative terminal of the second DC/DC converter module is an external output negative terminal of the entire voltage regulation module. When the first DC/DC converter module and the second DC/DC converter module are in a parallel conducted state, the output positive terminals of both the first DC/DC converter module and the second DC/DC converter module are external output positive terminals of the voltage regulation module, and the output negative terminals of both the first DC/DC converter module and the second DC/DC converter module are external output negative terminals of the voltage regulation module. The external output negative terminal and the external output positive terminal may be direct external output terminals, or may be indirect external output terminals, that is, the external output negative terminal and the external output positive terminal may be connected to a component such as a fuse, a diode, a switch, and a resistor.

The output negative terminal of the first DC/DC converter module may be directly or indirectly connected to the output positive terminal of the second DC/DC converter module by using the first controllable switch module, that is, in addition to the first controllable switch module, another component such as a diode, a resistor, and a fuse may be further disposed between the output negative terminal of the first DC/DC converter module and the output positive terminal of the second DC/DC converter module.

The output positive terminal of the first DC/DC converter module may be directly or indirectly connected to the output positive terminal of the second DC/DC converter module by using the second controllable switch module, that is, in addition to the second controllable switch module, another component such as a diode, a resistor, and a fuse may be further disposed between the output positive terminal of the first DC/DC converter module and the output positive terminal of the second DC/DC converter module.

The output negative terminal of the first DC/DC converter module may be directly or indirectly connected to the output negative terminal of the second DC/DC converter module by using the third controllable switch module, that is, in addition to the third controllable switch module, another component such as a diode, a resistor, and a fuse may be further disposed between the output negative terminal of the first DC/DC converter module and the output negative terminal of the second DC/DC converter module.

Each DC/DC converter group may include one DC/DC converter, or may include a plurality of DC/DC converters. The plurality of DC/DC converters may be connected in series, connected in parallel, or connected in series and parallel. This is not limited in this application. Connection manners and quantities of DC/DC converters included in the first DC/DC converter module and the second DC/DC converter module may be the same or different. It should be particularly noted that each or one DC/DC converter module may include two DC/DC converter units. The two DC/DC converter units may be connected in a connection manner between the first DC/DC converter module and the second DC/DC converter module. Connection manners and quantities of DC/DC converters included in all the DC/DC converter units may be the same or different. Each or one DC/DC converter unit may further include two DC/DC converter units, and by analogy.

A DC/DC converter may be of any isolated topology. An input structure of the DC/DC converter may not be limited, and the input structure may be a series structure, a parallel structure, or any other form. The DC/DC converter is an apparatus that is in a direct current circuit and that converts electric energy with a voltage value into electric energy with another voltage value, and can convert and regulate an input direct current voltage and then output the direct current voltage. Specifically, the DC/DC converter may include one or more of a boost converter, a buck converter, and a buck/boost converter.

A controllable switch module is a switch module that may be controlled, by using a control signal, to be closed or opened, may be a relay group or a contactor group, and may be of an alternating current type or a direct current type. Each controllable switch module may include one controllable switch, or may include a plurality of controllable switches. The plurality of controllable switches may be connected in parallel, connected in series, or connected in series and parallel. The controllable switch module is the first controllable switch module, the second controllable switch module, or the third controllable switch module. The first semiconductor device module is a controllable semiconductor device module. The second semiconductor device module and the third semiconductor device module each may be a controllable semiconductor device module, an uncontrollable semiconductor device module, or a combination of a controllable semiconductor device and an uncontrollable semiconductor device. A semiconductor device in the controllable semiconductor device module may be one or more of a silicon controlled rectifier (SCR), a metal-oxide semiconductor field-effect transistor (MOS), and an insulated gate bipolar transistor (IGBT). A semiconductor device in the uncontrollable semiconductor device module may be a diode. Each semiconductor device module may include one semiconductor device, or may include a plurality of semiconductor devices. Types of the plurality of semiconductor devices may be the same or different. The plurality of semiconductor devices may be connected in series, connected in parallel, or connected in series and parallel.

The MOS transistor and the IGBT transistor each include a diode. When a drive of the MOS transistor or the IGBT transistor is turned on, the MOS transistor or the IGBT transistor is in a bidirectional conductible state. When a drive of the MOS transistor or the IGBT transistor is turned off, the MOS transistor or the IGBT transistor is in a unidirectional conductible state, that is, the MOS transistor or the IGBT transistor may be conducted by using the diode in the MOS transistor or the IGBT transistor. It may be understood that, if the drives of the MOS transistor and the IGBT transistor are turned off, the MOS transistor and the IGBT transistor each may be used as a diode. Further, herein, although a MOS transistor group and an IGBT transistor group each are a controllable semiconductor device, the MOS transistor group and the IGBT transistor group may not be electrically connected to a processor. Alternatively, although the MOS transistor group and the IGBT transistor group are electrically connected to the processor, the processor does not control the MOS transistor group and the IGBT transistor group, or does not control states of the drives of the MOS transistor group and the IGBT transistor group to be changed, so that the drives of the MOS transistor group and the IGBT transistor group are always in a turn-off state.

When a drive of the SCR is turned on, the SCR is in a unidirectional conductible state. When a drive of the SCR is turned off, the SCR is in a non-conductible state that may also be referred to as a cut-off state. It may be understood that, when the drive of the SCR is turned on, the SCR may be further used as a diode. To be specific, the SCR may be electrically connected to the processor, but the processor may not control a state of the drive of the SCR to be changed, so that the drive of the SCR is always in a turn-on state.

In addition, the diode is an uncontrollable semiconductor device, and is always in a unidirectional conductible state.

To control each semiconductor device module and each controllable switch module, the voltage regulation module may further include a processor. The processor is a control component of the voltage regulation module, may be electrically connected to a plurality of controllable switch modules, and may also be electrically connected to the first semiconductor device module. In a switching process, the processor may control each controllable switch module and each semiconductor device module to be turned on and turned off based on a specific time sequence, so that seamless switching without power-off can be implemented.

In this embodiment of this application, a voltage regulation module is provided, and may be used in a charging module to regulate an output voltage. A series circuit and a parallel circuit are disposed in the voltage regulation module, and a controllable switch module is disposed in each of the series circuit and the parallel circuit. In this way, when a low-voltage output is required, the parallel circuit may be conducted, and the series circuit may be disconnected; or when a high-voltage output is required, the series circuit may be conducted, and the parallel circuit may be disconnected, so that the output voltage can be regulated in a wide range.

In addition, in a process of charging an electric vehicle, a charging voltage also needs to correspondingly increase as a voltage of a charging battery of the electric vehicle gradually increases. If the first DC/DC converter module and the second DC/DC converter module in the voltage regulation module are initially in a parallel conducted state, output voltages of the two DC/DC converter modules may be controlled to increase. After the output voltage of the DC/DC converter module is regulated to a highest value, if a voltage requirement of the charging battery still cannot be met, the two DC/DC converter modules need to be switched from the parallel conducted state to the series conducted state that may also be referred to as a high-voltage output state.

According to the voltage regulation module provided in this embodiment of this application, the semiconductor device module is connected in parallel between two terminals of the controllable switch module, so that the series circuit and the parallel circuit can also be conducted by using the semiconductor device module. When the controllable switch modules are all opened, the voltage adjustment module is not powered off, so that seamless switching between the high-voltage output state and a low-voltage output state without power-off is implemented. In the switching process, charging of the electric vehicle is not interrupted, and charging experience of the electric vehicle is improved.

In addition to the field of charging technologies of electric vehicles, the voltage regulation module provided in this embodiment of this application may be further applied to another charging apparatus to charge another terminal, for example, applied to a charger of a terminal such as a mobile phone or a computer.

In a possible implementation, the first semiconductor device module includes at least one of a metal-oxide semiconductor field-effect transistor MOS transistor, an insulated gate bipolar transistor IGBT transistor, and a silicon controlled rectifier SCR. The second semiconductor device module includes at least one of a diode, a MOS transistor, an IGBT transistor, and an SCR. The third semiconductor device module includes at least one of a diode, a MOS transistor, an IGBT transistor, and an SCR.

In this embodiment of this application, each semiconductor device module may include one semiconductor device, or may include a plurality of semiconductor devices. Types of the plurality of semiconductor devices may be the same or different. The plurality of semiconductor devices may be connected in series, connected in parallel, or connected in series and parallel.

To simplify control logic, each semiconductor device module may include only one type of semiconductor device. In this case, the first semiconductor device module is a MOS transistor module, an IGBT transistor module, or an SCR module; the second semiconductor device module is a diode module, a MOS transistor module, an IGBT transistor module, or an SCR module; and the third semiconductor device module is a diode module, a MOS transistor module, an IGBT transistor module, or an SCR module.

In a possible implementation, the first semiconductor device module includes a MOS transistor or an IGBT transistor, an anode of a diode in the MOS transistor or the IGBT transistor is connected to the output negative terminal of the first DC/DC converter module, and a cathode of the diode in the MOS transistor or the IGBT transistor is connected to the output positive terminal of the second DC/DC converter module; or the first semiconductor device module includes an SCR, an anode of the SCR is connected to the output negative terminal of the first DC/DC converter module, and a cathode of the SCR is connected to the output positive terminal of the second DC/DC converter module.

In this embodiment of this application, the foregoing connection manner may implement the following effects.

When a drive of a controllable semiconductor device is in a turn-off state, the first DC/DC converter module and the second DC/DC converter module may not be conducted by using the controllable semiconductor device. When a drive of a controllable semiconductor device is in a turn-on state, if a voltage of one terminal that is of the controllable semiconductor device and that is connected to the output positive terminal of the second DC/DC converter module is greater than a voltage of the other terminal of the controllable semiconductor device, the first DC/DC converter module and the second DC/DC converter module are conducted by using the controllable semiconductor device.

In a possible implementation, the second semiconductor device module includes a MOS transistor or an IGBT transistor, an anode of a diode in the MOS transistor or the IGBT transistor is connected to the output positive terminal of the second DC/DC converter module, and a cathode of the diode in the MOS transistor or the IGBT transistor is connected to the output positive terminal of the first DC/DC converter module; or the second semiconductor device module includes a diode or an SCR, an anode of the diode or the SCR is connected to the output positive terminal of the second DC/DC converter module, and a cathode of the diode or the SCR is connected to the output positive terminal of the first DC/DC converter module.

In this embodiment of this application, the foregoing connection manner may implement the following effects.

The second semiconductor device module may implement a unidirectional conducted state in which a current flows from the output positive terminal of the second DC/DC converter module to the output positive terminal of the first DC/DC converter module.

In a possible implementation, the third semiconductor device module includes a MOS transistor or an IGBT transistor, an anode of a diode in the MOS transistor or the IGBT transistor is connected to the output negative terminal of the second DC/DC converter module, and a cathode of the diode in the MOS transistor or the IGBT transistor is connected to the output negative terminal of the first DC/DC converter module; or the third semiconductor device module includes a diode or an SCR, an anode of the diode or the SCR is connected to the output negative terminal of the second DC/DC converter module, and a cathode of the diode or the SCR is connected to the output negative terminal of the first DC/DC converter module.

In this embodiment of this application, the foregoing connection manner may implement the following effects.

The third semiconductor device module may implement a unidirectional conducted state in which a current flows from the output negative terminal of the second DC/DC converter module to the output negative terminal of the first DC/DC converter module.

In a possible implementation, when the first DC/DC converter module and the second DC/DC converter module are in a series conducted state, the first controllable switch module is in a closed state, the second controllable switch module and the third controllable switch module are in an opened state, a drive of the first semiconductor device is in a turn-on state or a turn-off state, and the second semiconductor device module and the third semiconductor device module are in a non-conductible state or a unidirectional conductible state; or when the first DC/DC converter module and the second DC/DC converter module are in a parallel conducted state, the second controllable switch module and the third controllable switch module are in a closed state, the first controllable switch module is in an opened state, a drive of the first semiconductor device is in a turn-off state, and the second semiconductor device module and the third semiconductor device module are in a non-conductible state, a bidirectional conductible state, or a unidirectional conductible state.

That the first DC/DC converter module and the second DC/DC converter module are in a series conducted state may also mean that the voltage regulation module is in a high-voltage output state. That the first DC/DC converter module and the second DC/DC converter module are in a parallel conducted state may also mean that the voltage regulation module is in a low-voltage output state.

In this embodiment of this application, when the first controllable switch module is in a closed state, the second controllable switch module and the third controllable switch module are in an opened state, the drive of the first semiconductor device is in a turn-on state or a turn-off state, and the second semiconductor device module and the third semiconductor device module are in a non-conductible state or a unidirectional conductible state, the series circuit is conducted by using the first controllable switch module.

When the second controllable switch module and the third controllable switch module are in a closed state, the first controllable switch module is in an opened state, the drive of the first semiconductor device is in a turn-off state, and the second semiconductor device module and the third semiconductor device module are in a non-conductible state, a unidirectional conductible state, or a bidirectional conductible state, the parallel circuit is conducted by using the second controllable switch module and the third controllable switch module.

In a possible implementation, the voltage regulation module further includes a processor, and the processor is configured to: in a process in which the first DC/DC converter module and the second DC/DC converter module are switched from the parallel conducted state to the series conducted state, when the second semiconductor device module and the third semiconductor device module are in a unidirectional conductible state or a bidirectional conductible state, control the second controllable switch module and the third controllable switch module to be opened; when the second controllable switch module and the third controllable switch module are in an opened state, and the second semiconductor device module and the third semiconductor device module are in a unidirectional conductible state, control the drive of the first semiconductor device module to be turned on; and after the drive of the first semiconductor device module is turned on, control the first controllable switch module to be closed.

In this embodiment of this application, when the second semiconductor device module and the third semiconductor device module are in a unidirectional conductible state or a bidirectional conductible state, the second controllable switch module and the third controllable switch module are controlled to be opened. Therefore, it may be ensured that the instant that the second controllable switch module and the third controllable switch module are opened, a current may automatically continue to flow through each of the second semiconductor device module and the third semiconductor device. This also enables the second controllable switch module and the third controllable switch module to be opened at a small voltage.

When the second controllable switch module and the third controllable switch module are in an opened state, and the second semiconductor device module and the third semiconductor device module are in a unidirectional conductible state (if the second semiconductor device module and the third semiconductor device module are previously in a bidirectional conductible state, switching to the unidirectional conductible state is required), the drive of the first semiconductor device module is controlled to be turned on. Therefore, it may be ensured that the instant that the drive of the first semiconductor device module is turned on, the first DC/DC converter module and the second DC/DC converter module are not short-circuited, and are immediately conducted by using the first semiconductor device module.

After the drive of the first semiconductor device module is turned on, the first controllable switch module is closed, so that the first DC/DC converter module and the second DC/DC converter module are conducted by using the first controllable switch module, to complete switching. This also enables the first controllable switch module to be closed at a small voltage.

It should be noted that, when the second controllable switch module and the third controllable switch module are controlled to be opened, the second controllable switch module and the third controllable switch module may be simultaneously opened, or may not be simultaneously opened.

In a possible implementation, the voltage regulation module further includes a processor, and the processor is configured to: in a process in which the first DC/DC converter module and the second DC/DC converter module are switched from the series conducted state to the parallel conducted state, when the drive of the first semiconductor device module is in a turn-on state, control the first controllable switch module to be opened; when the first controllable switch module is in an opened state, and the second semiconductor device module and the third semiconductor device module are in a unidirectional conductible state, control the drive of the first semiconductor device module to be turned off; and after the drive of the first semiconductor device module is turned off, control the second controllable switch module and the third controllable switch module to be closed.

In this embodiment of this application, when the drive of the first semiconductor device module is in a turn-on state, the first controllable switch module is controlled to be opened. Therefore, it may be ensured that the instant that the first controllable switch module is opened, a current may automatically continue to flow through the first semiconductor device module. This also enables the first controllable switch module to be opened at a small voltage.

When the first controllable switch module is in an opened state, and the second semiconductor device module and the third semiconductor device module are in a unidirectional conductible state (if the second semiconductor device module and the third semiconductor device module are previously in a bidirectional conductible state or a non-conductible state, switching to the unidirectional conductible state is required), the drive of the first semiconductor device module is controlled to be turned off. Therefore, it may be ensured that the instant that the drive of the first semiconductor device module is turned off, the first DC/DC converter module and the second DC/DC converter module are not short-circuited, and are immediately conducted by using the second semiconductor device module and the third semiconductor device module. Then, the second controllable switch module and the third controllable switch module are closed, so that the first DC/DC converter module and the second DC/DC converter module are conducted by using the second controllable switch module and the third controllable switch module, to complete switching. This also enables the second controllable switch module and the third controllable switch module to be closed at a small voltage.

It should be noted that, when the second controllable switch module and the third controllable switch module are closed, the second controllable switch module and the third controllable switch module may be simultaneously closed, or may not be simultaneously closed.

It may be learned that, in the foregoing switching process, one of the series circuit and the parallel circuit is always in a conducted state. Therefore, according to the voltage regulation module provided in this embodiment of this application, seamless switching without power-off can be implemented in the switching process. This improves charging experience of the electric vehicle, and improves a service life of the charging battery.

In addition, the semiconductor device module is connected in parallel between two terminals of the controllable switch module. The instant that the controllable switch module is opened, a current automatically continues to flow through the semiconductor device module. The instant that the controllable switch module is closed, a semiconductor device module connected in parallel with the controllable switch module at a previous moment is in a conducted state. Therefore, the controllable switch module is opened and closed at a small voltage. This improves a service life of the controllable switch module. In addition, due to the feature, when the controllable switch module is an alternating current relay, because the controllable switch module is opened and closed at a small voltage, sparking and arcing that occur at a large voltage in a related technology do not occur. Therefore, a cheap alternating current relay may be used instead of an expensive direct current relay, to reduce costs.

In a possible implementation, when the first DC/DC converter module and the second DC/DC converter module are in a series conducted state, the first controllable switch module is in a closed state, the second controllable switch module and the third controllable switch module are in an opened state, and a drive of the first semiconductor device module is in a turn-on state; or when the first DC/DC converter module and the second DC/DC converter module are in a parallel conducted state, the first controllable switch module is in an opened state, the second controllable switch module and the third controllable switch module are in a closed state, and a drive of the first semiconductor device module is in a turn-off state.

The second semiconductor device module and the third semiconductor device module each may include a diode. Alternatively, the second semiconductor device module and the third semiconductor device module each include a MOS transistor or an IGBT transistor whose drive is always in a turn-off state. Alternatively, the second semiconductor device module and the third semiconductor device module each include an SCR whose drive is always in a turn-on state. Alternatively, the second semiconductor device module and the third semiconductor device module each may be any combination of the foregoing semiconductor devices.

The diode has a same function as the MOS transistor or the IGBT transistor whose drive is always in a turn-off state and the SCR whose drive is always in a turn-on state. Therefore, control logic existing when the second semiconductor device module and the third semiconductor device module each include a diode is the same as control logic existing when the second semiconductor device module and the third semiconductor device module each include a MOS transistor or an IGBT transistor whose drive is always in a turn-off state and an SCR whose drive is always in a turn-on state.

In this embodiment of this application, when the first DC/DC converter module and the second DC/DC converter module are in a series conducted state, the first controllable switch module is in a closed state, and the second controllable switch module and the third controllable switch module are in an opened state. In this case, the series circuit is conducted. In addition, because the drive of the first semiconductor device module is in a turn-on state, the instant that the first controllable switch module is opened, a current automatically continues to flow through the first semiconductor device module.

When the first DC/DC converter module and the second DC/DC converter module are in a parallel conducted state, the first controllable switch module is in an opened state, and the second controllable switch module and the third controllable switch module are in a closed state. In this case, the parallel circuit is conducted. In addition, the second semiconductor device module and the third semiconductor device module each are a diode group. Therefore, the instant that the second controllable switch module and the third controllable switch module are opened, a forward voltage drop is generated between two terminals of each of the second semiconductor device module and the third semiconductor device module, and a current automatically continues to flow through each of the second semiconductor device module and the third semiconductor device module.

In a possible implementation, the voltage adjustment module further includes a processor, and the processor is configured to: in a process in which the first DC/DC converter module and the second DC/DC converter module are switched from the parallel conducted state to the series conducted state, control the second controllable switch module and the third controllable switch module to be opened; after the second controllable switch module and the third controllable switch module are opened, control the drive of first semiconductor device module to be turned on; and after the drive of the first semiconductor device module is turned on, control the first controllable switch module to be closed.

In this embodiment of this application, when switching to the series conducted state is required, the processor first controls the second controllable switch module and the third controllable switch module to be opened. In this case, a forward voltage drop is generated between two terminals of each of the second semiconductor device module and the third semiconductor device module, and a current automatically continues to flow through each of the second semiconductor device module and the third semiconductor device module. Then, the processor controls the drive of the first semiconductor device module to be turned on. In this case, the series circuit is immediately conducted by using the first semiconductor device module, the forward voltage drop between the two terminals of each of the second semiconductor device module and the third semiconductor device module disappears, and the second semiconductor device module and the third semiconductor device module are automatically cut off. Finally, the processor controls the first controllable switch module to be closed. In this case, the series circuit is conducted by using the first controllable switch module, and the entire switching process is completed.

In a possible implementation, the voltage adjustment module further includes a processor, and the processor is configured to: in a process in which the first DC/DC converter module and the second DC/DC converter module are switched from the series conducted state to the parallel conducted state, control the first controllable switch module to be opened; after the first controllable switch module is opened, control the drive of the first semiconductor device module to be turned off; and after the drive of the first semiconductor device is turned off, control the second controllable switch module and the third controllable switch module to be closed.

In this embodiment of this application, when switching to the parallel conducted state is required, the processor first controls the first controllable switch module to be opened.

Because the drive of the first semiconductor device module is in a turn-on state, a current automatically continues to flow through the first semiconductor device module, and the series circuit remains in a conducted state. Then, the processor controls the drive of the first semiconductor device module to be turned off. In this case, a forward voltage difference is immediately generated between two terminals of each of the second semiconductor device module and the third semiconductor device module, and the second semiconductor device module and the third semiconductor device module are conducted. Finally, the processor controls the second controllable switch module and the third controllable switch module to be closed. In this case, the parallel circuit is conducted by using the second controllable switch module and the third controllable switch module, and the entire switching process is completed.

In a possible implementation, the second semiconductor device module includes at least one of a MOS transistor and an IGBT transistor, and the third semiconductor device module includes at least one of a MOS transistor and an IGBT transistor. When the first DC/DC converter module and the second DC/DC converter module are in a series conducted state, the first controllable switch module is in a closed state, the second controllable switch module and the third controllable switch module are in an opened state, a drive of the first semiconductor device module is in a turn-on state, and drives of the second semiconductor device module and the third semiconductor device module are in a turn-off state; or when the first DC/DC converter module and the second DC/DC converter module are in a parallel conducted state, the first controllable switch module is in an opened state, the second controllable switch module and the third controllable switch module are in a closed state, a drive of the first semiconductor device module is in a turn-off state, and drives of the second semiconductor device module and the third semiconductor device module are in a turn-on state.

In this embodiment of this application, when the first DC/DC converter module and the second DC/DC converter module are in a series conducted state, the first controllable switch module is in a closed state, and the second controllable switch module and the third controllable switch module are in an opened state. In this case, the series circuit is conducted. In addition, because the drive of the first semiconductor device module is in a turn-on state, the instant that the first controllable switch module is opened, a current automatically continues to flow through the first semiconductor device module.

When the first DC/DC converter module and the second DC/DC converter module are in a parallel conducted state, the first controllable switch module is in an opened state, and the second controllable switch module and the third controllable switch module are in a closed state. In this case, the parallel circuit is conducted. In addition, because semiconductor devices in the second semiconductor device module and the third semiconductor device module each include a diode, the instant that the second controllable switch module and the third controllable switch module are opened, a current automatically continues to flow through each of the second semiconductor device module and the third semiconductor device.

It should be noted that, because the MOS transistor and the IGBT transistor each include a diode, the MOS transistor and the IGBT transistor each may be totally used as a diode. Therefore, when the third semiconductor device module and the second semiconductor device module each include a MOS transistor and an IGBT transistor, the MOS transistor and the IGBT transistor may not need to be electrically connected to the processor, and drives of the MOS transistor and the IGBT transistor are always in a turn-off state. Alternatively, although the MOS transistor and the IGBT transistor are connected to the processor, the processor may not control the MOS transistor and the IGBT transistor.

In a possible implementation, when the second semiconductor device module and the third semiconductor device module each include at least one of a MOS transistor and an IGBT transistor, the voltage regulation module further includes a processor, and the processor is configured to: in a process in which the first DC/DC converter module and the second DC/DC converter module are switched from the parallel conducted state to the series conducted state, control the second controllable switch module and the third controllable switch module to be opened; after the second controllable switch module and the third controllable switch module are opened, control the drives of the second semiconductor device module and the third semiconductor device module to be turned off; after the drives of the second semiconductor device module and the third semiconductor device module are turned off, control the drive of the first semiconductor device module to be turned on; and after the drive of the first semiconductor device module is turned on, control the first controllable switch module to be closed.

In this embodiment of this application, when switching to the series conducted state is required, the processor first controls the second controllable switch module and the third controllable switch module to be opened. In this case, a current automatically continues to flow through each of the second semiconductor device module and the third semiconductor device module. Then, the processor controls the drives of the second semiconductor device module and the third semiconductor device module to be turned off. In this case, a current may continue to be conducted by using the diode in each of the second semiconductor device module and the third semiconductor device module. Then, the processor controls the drive of the first semiconductor device module to be turned on. In this case, the series circuit is conducted by using the first semiconductor device module, and the diode in each of the second semiconductor device module and the third semiconductor device module is automatically cut off. Finally, the processor controls the first controllable switch module to be closed. In this case, the series circuit is conducted by using the first controllable switch module, and the entire switching process is completed.

In a possible implementation, when the second semiconductor device module and the third semiconductor device module each include at least one of a MOS transistor and an IGBT transistor, the voltage regulation module further includes a processor, and the processor is configured to: in a process in which the first DC/DC converter module and the second DC/DC converter module are switched from the series conducted state to the parallel conducted state, control the first controllable switch module to be opened; after the first controllable switch module is opened, control the drive of the first semiconductor device module to be turned off; after the drive of the first semiconductor device module is turned off, control the drives of the second semiconductor device module and the third semiconductor device module to be turned on; and after the drives of the second semiconductor device module and the third semiconductor device module are turned on, control the second controllable switch module and the third controllable switch module to be closed.

In this embodiment of this application, when switching to the parallel conducted state is required, the processor first controls the first controllable switch module to be opened. Because the drive of the first semiconductor device module is in a turn-on state, a current automatically continues to flow through the first semiconductor device module, and the series circuit remains in a conducted state. Then, the processor controls the drive of the first semiconductor device module to be turned off. In this case, a forward voltage difference is immediately generated between two terminals of each of the second semiconductor device module and the third semiconductor device module, and the parallel circuit is conducted by using the diode in each of the second semiconductor device module and the third semiconductor device module. Then, the processor controls the drives of the second semiconductor device module and the third semiconductor device module to be turned on. Finally, the processor controls the second controllable switch module and the third controllable switch module to be closed. In this case, the parallel circuit is conducted by using the second controllable switch module and the third controllable switch module, and the entire switching process is completed.

In a possible implementation, the second semiconductor device module and the third semiconductor device module each include an SCR. When the first DC/DC converter module and the second DC/DC converter module are in a series conducted state, the first controllable switch module is in a closed state, the second controllable switch module and the third controllable switch module are in an opened state, a drive of the first semiconductor device module is in a turn-on state, and drives of the second semiconductor device module and the third semiconductor device module are in a turn-off state or a turn-on state; or when the first DC/DC converter module and the second DC/DC converter module are in a parallel conducted state, the first controllable switch module is in an opened state, the second controllable switch module and the third controllable switch module are in a closed state, a drive of the first semiconductor device module is in a turn-off state, and drives of the second semiconductor device module and the third semiconductor device module are in a turn-on state.

In this embodiment of this application, when the first DC/DC converter module and the second DC/DC converter module are in a series conducted state, the first controllable switch module is in a closed state, and the second controllable switch module and the third controllable switch module are in an opened state. In this case, the series circuit is conducted. In addition, because the drive of the first semiconductor device module is in a turn-on state, the instant that the first controllable switch module is opened, a current automatically continues to flow through the first semiconductor device module.

When the first DC/DC converter module and the second DC/DC converter module are in a parallel conducted state, the first controllable switch module is in an opened state, and the second controllable switch module and the third controllable switch module are in a closed state. In this case, the parallel circuit is conducted. To enable a current to automatically continue to flow through each of the second semiconductor device module and the third semiconductor device module after the series circuit is disconnected, when the drive of the first semiconductor device module is turned off, the drives of the second semiconductor device module and the third semiconductor device should be turned on.

It should be noted that, after a drive of the SCR is turned on, the SCR may be used as a diode. Therefore, the drives of the second semiconductor device module and the third semiconductor device module may be always in a turn-on state.

In a possible implementation, when the second semiconductor device module and the third semiconductor device module each are an SCR, the voltage regulation module further includes a processor, and the processor is configured to: in a process in which the first DC/DC converter module and the second DC/DC converter module are switched from the parallel conducted state to the series conducted state, control the second controllable switch module and the third controllable switch module to be opened; after the second controllable switch module and the third controllable switch module are opened, control the drive of first semiconductor device module to be turned on; and after the drive of the first semiconductor device module is turned on, control the first controllable switch module to be closed.

When switching to the series conducted state is required, the processor first controls the second controllable switch module and the third controllable switch module to be opened. In this case, because the drives of the second semiconductor device module and the third semiconductor device module are in a turn-on state, a current automatically continues to flow through each of the second semiconductor device module and the third semiconductor device module. Then, the processor controls the drive of the first semiconductor device module to be turned on. In this case, the series circuit is conducted by using the first semiconductor device module, and the second semiconductor device module and the third semiconductor device module are automatically cut off. Finally, the processor controls the first controllable switch module to be closed. In this case, the series circuit is conducted by using the first controllable switch module, and the entire switching process is completed.

In a possible implementation, when the second semiconductor device module and the third semiconductor device module each are an SCR, the voltage regulation module further includes a processor, and the processor is configured to: in a process in which the first DC/DC converter module and the second DC/DC converter module are switched from the series conducted state to the parallel conducted state, control the first controllable switch module to be opened; if the drives of the second semiconductor device module and the third semiconductor device module are in a turn-off state, after the first controllable switch module is opened, control the drives of the second semiconductor device module and the third semiconductor device module to be turned on; after the drives of the second semiconductor device module and the third semiconductor device module are turned on, control the drive of the first semiconductor device module to be turned off; and after the drive of the first semiconductor device module is turned off, control the second controllable switch module and the third controllable switch module to be closed; or control the first controllable switch module to be opened; if the drives of the second semiconductor device module and the third semiconductor device module are in a turn-on state, after the first controllable switch module is opened, control the drive of the first semiconductor device module to be turned off; and after the drive of the first semiconductor device module is turned off, control the second controllable switch module and the third controllable switch module to be closed.

In this embodiment of this application, when switching to the parallel conducted state is required, specific switching processes are also different depending on different states of the drives of the second semiconductor device module and the third semiconductor device module.

Initially, the drives of the second semiconductor device module and the third semiconductor device module are in a turn-off state.

The processor first controls the first controllable switch module to be opened. Because the drive of the first semiconductor device module is in a turn-on state, a current automatically continues to flow through the first semiconductor device module, and the series circuit remains in a conducted state. Then, the processor controls the drives of the second semiconductor device module and the third semiconductor device module to be turned on. In this case, because the drive of the first semiconductor device module is turned on, the series circuit remains in a conducted state. Then, the processor controls the drive of the first semiconductor device to be turned off. In this case, a forward voltage difference is immediately generated between two terminals of each of the second semiconductor device module and the third semiconductor device module, and the second semiconductor device module and the third semiconductor device module are conducted. Finally, the processor controls the second controllable switch module and the third controllable switch module to be closed. In this case, the parallel circuit is conducted by using the second controllable switch module and the third controllable switch module, and the entire switching process is completed.

Initially, the drives of the second semiconductor device module and the third semiconductor device module are in a turn-on state.

The processor first controls the first controllable switch module to be opened. Because the drive of the first semiconductor device module is in a turn-on state, a current automatically continues to flow through the first semiconductor device module, and the series circuit remains in a conducted state. Then, the processor controls the drive of the first semiconductor device to be turned off. In this case, a forward voltage difference is immediately generated between two terminals of each of the second semiconductor device module and the third semiconductor device module, and the second semiconductor device module and the third semiconductor device module are conducted. Finally, the processor controls the second controllable switch module and the third controllable switch module to be closed. In this case, the parallel circuit is conducted by using the second controllable switch module and the third controllable switch module, and the entire switching process is completed.

In a possible implementation, the voltage regulation module further includes a first capacitor and a second capacitor, two terminals of the first capacitor are respectively connected to the output positive terminal and the output negative terminal of the first DC/DC converter module, and two terminals of the second capacitor are respectively connected to the output positive terminal and the output negative terminal of the second DC/DC converter module.

In this embodiment of this application, the first capacitor is disposed between the output positive terminal and the output negative terminal of the first DC/DC converter module, and the second capacitor is disposed between the output positive terminal and the output negative terminal of the second DC/DC converter module, so that rectification and filtering can be performed, and some alternating current components in direct current power that is output by the DC/DC converter module can be filtered out. Therefore, the output voltage is more stable, charging experience of the electric vehicle is improved, and a service life of the charging battery is prolonged.

In a possible implementation, the voltage regulation module further includes a third capacitor, and two terminals of the third capacitor are respectively connected to the output positive terminal of the first DC/DC converter module and the output negative terminal of the second DC/DC converter module.

In this embodiment of this application, the third capacitor is disposed between the output positive terminal of the first DC/DC converter module and the output negative terminal of the second DC/DC converter module, so that rectification and filtering can also be performed, and some alternating current components in direct current power that is output by the voltage regulation module can be filtered out. Therefore, the output voltage is more stable, and charging experience of the electric vehicle is improved.

According to a second aspect, an embodiment of this application provides a voltage regulation module, including a first direct current-direct current DC/DC converter module, a second DC/DC converter module, a first controllable switch module, a second controllable switch module, a third controllable switch module, a second semiconductor device module, and a third semiconductor device module. An output negative terminal of the first DC/DC converter module is connected to an output positive terminal of the second DC/DC converter module by using the first controllable switch module. An output positive terminal of the first DC/DC converter module is connected to the output positive terminal of the second DC/DC converter module by using the second controllable switch module. The output negative terminal of the first DC/DC converter module is connected to an output negative terminal of the second DC/DC converter module by using the third controllable switch module. The second semiconductor device module is connected in parallel between two terminals of the second controllable switch module. The third semiconductor device module is connected in parallel between two terminals of the third controllable switch module.

For descriptions of components in the voltage regulation module, refer to descriptions of corresponding components in the first aspect. Details are not described herein again. For a connection manner of each component, refer to content in the first aspect.

The voltage regulation module provided in the second aspect may be understood as being obtained after the first semiconductor device module is removed from any voltage regulation module provided in the first aspect.

In this embodiment of this application, compared with the switching process of the voltage regulation module provided in the first aspect, the voltage regulation module provided in the second aspect lacks the first semiconductor device group. Therefore, in a process of switching between a series state and a parallel state, an action of the first semiconductor device in the voltage regulation module provided in the first aspect may be removed, to obtain a state change process of each component in the switching process of the voltage regulation module provided in the second aspect.

The voltage regulation module provided in this embodiment of this application may be used in a charging module to regulate an output voltage. A series circuit and a parallel circuit are disposed in the voltage regulation module, and a controllable switch module is disposed in each of the series circuit and the parallel circuit. In this way, when a low-voltage output is required, the parallel circuit may be conducted, and the series circuit may be disconnected; or when a high-voltage output is required, the series circuit may be conducted, and the parallel circuit may be disconnected, so that the output voltage can be regulated in a wide range.

In addition to the field of charging technologies of electric vehicles, the voltage regulation module provided in this embodiment of this application may be further applied to another charging apparatus to charge another terminal, for example, applied to a charger of a terminal such as a mobile phone or a computer.

According to the voltage regulation module provided in this embodiment of this application, in a process of switching from the series conducted state to the parallel conducted state, when the second semiconductor device module and the third semiconductor device module are in a unidirectional conductible state, the first controllable switch module may be opened. In this case, a forward voltage drop is immediately generated between two terminals of each of the second semiconductor device module and the third semiconductor device module, and the parallel circuit is immediately conducted by using the second semiconductor device module and the third semiconductor device module. Then, the second controllable switch group and the third controllable switch group are closed, to complete switching.

In a switching process of switching from the parallel conducted state to the series conducted state, when the second semiconductor device module and the third semiconductor device module are in a unidirectional conductible state, the second controllable switch module and the third controllable switch module are opened. In this case, a forward voltage drop is immediately generated between two terminals of each of the second semiconductor device module and the third semiconductor device module, and the parallel circuit is conducted by using the second semiconductor device module and the third semiconductor device module. Then, the first controllable switch module is closed. In this case, the forward voltage drop generated between the two terminals of each of the second semiconductor device module and the third semiconductor device module disappears, and the series circuit is immediately conducted by using the first controllable switch module, to complete switching.

It may be learned that, in the foregoing switching process, one of the series circuit and the parallel circuit is always in a conducted state. Therefore, according to the voltage regulation module provided in this embodiment of this application, seamless switching without power-off can be implemented in the switching process. This improves charging experience of the electric vehicle.

In addition, the second semiconductor device module and the third semiconductor device module are respectively connected in parallel between two terminals of the second controllable switch module and two terminals of the third controllable switch module. The instant that the controllable switch module is opened, a current automatically continues to flow through the semiconductor device module. The instant that the controllable switch module is closed, a semiconductor device module connected in parallel with the controllable switch module at a previous moment is in a conducted state. Therefore, the second controllable switch module and the third controllable switch module are opened and closed at a small voltage. This improves a service life of each of the second controllable switch module and the third controllable switch module. In addition, due to the feature, when the second controllable switch module and the third controllable switch module each are an alternating current relay, because the second controllable switch module and the third controllable switch module are opened and closed at a small voltage, sparking and arcing that occur at a large voltage in a related technology do not occur. Therefore, a cheap alternating current relay may be used instead of an expensive direct current relay, to reduce costs.

When the first DC/DC converter module and the second DC/DC converter module each include a diode:

When the voltage regulation module is in a series conducted state, the first controllable switch module is in a closed state, and the second controllable switch module and the third controllable switch module are in an opened state. When the voltage regulation module is in a parallel conducted state, the first controllable switch module is in an opened state, and the second controllable switch module and the third controllable switch module are in a closed state.

In a process of switching from the parallel conducted state to the series conducted state, the second controllable switch module and the third controllable switch module are controlled to be opened. In this case, a current automatically continues to flow through each of the second semiconductor device group and the third semiconductor device group. After the second controllable switch module and the third controllable switch module are opened, the first controllable switch module is closed.

In a process of switching from the series conducted state to the parallel conducted state, the first controllable switch module is controlled to be opened. In this case, the second semiconductor device group and the third semiconductor device group are immediately conducted. After the first controllable switch module is opened, the second controllable switch module and the third controllable switch module are closed.

When the second semiconductor device module includes at least one of a MOS transistor and an IGBT transistor, and the third semiconductor device module includes at least one of a MOS transistor and an IGBT transistor, the following case exists:

When the voltage regulation module is in a series conducted state, the first controllable switch module is in a closed state, the second controllable switch module and the third controllable switch module are in an opened state, and drives of the second semiconductor device module and the third semiconductor device module are in a turn-off state. When the voltage regulation module is in a parallel conducted state, the first controllable switch module is in an opened state, the second controllable switch module and the third controllable switch module are in a closed state, and drives of the second semiconductor device module and the third semiconductor device module are in a turn-on state.

In a process of switching from the parallel conducted state to the series conducted state, the second controllable switch module and the third controllable switch module are enabled to be opened. After the second controllable switch module and the third controllable switch module are opened, the drives of the second semiconductor device module and the third semiconductor device module are enabled to be turned off. After the drives of the second semiconductor device module and the third semiconductor device module are turned off, the first controllable switch module is enabled to be closed.

In a process of switching from the series conducted state to the parallel conducted state, the first controllable switch module is enabled to be opened. After the first controllable switch module is opened, the drives of the second semiconductor device module and the third semiconductor device module are enabled to be turned on. After the drives of the second semiconductor device module and the third semiconductor device module are turned on, the second controllable switch module and the third controllable switch module are enabled to be closed.

When the second semiconductor device module and the third semiconductor device module each include an SCR, the following case exists:

When the first DC/DC converter module and the second DC/DC converter module are in a series conducted state, the first controllable switch module is in a closed state, the second controllable switch module and the third controllable switch module are in an opened state, and drives of the second semiconductor device module and the third semiconductor device module are in a turn-off state or a turn-on state. When the first DC/DC converter module and the second DC/DC converter module are in a parallel conducted state, the first controllable switch module is in an opened state, the second controllable switch module and the third controllable switch module are in a closed state, and drives of the second semiconductor device module and the third semiconductor device module are in a turn-on state.

In a process of switching from the parallel conducted state to the series conducted state, the second controllable switch module and the third controllable switch module are enabled to be opened. After the second controllable switch module and the third controllable switch module are opened, the first controllable switch module is enabled to be closed.

In a process of switching from the series conducted state to the parallel conducted state, the first controllable switch module is enabled to be opened. If the drives of the second semiconductor device module and the third semiconductor device module are in a turn-off state, after the first controllable switch module is opened, the drives of the second semiconductor device module and the third semiconductor device module are enabled to be turned on. After the drives of the second semiconductor device module and the third semiconductor device module are turned on, the second controllable switch module and the third controllable switch module are enabled to be closed.

Alternatively, in a process of switching from the series conducted state to the parallel conducted state, the first controllable switch module is enabled to be opened. If the drives of the second semiconductor device module and the third semiconductor device module are in a turn-on state, after the first controllable switch module is opened, the second controllable switch module and the third controllable switch module are enabled to be closed.

According to a third aspect, an embodiment of this application provides a charging module, where the charging module includes the voltage regulation module according to any one of the implementations of the first aspect and the second aspect.

The charging module may be applied to a charging pile, or may be applied to another charging apparatus.

In this embodiment of this application, the charging module may include the voltage regulation module and an alternating current-direct current conversion module. The alternating current-direct current conversion module is configured to: convert alternating current power into direct current power, and output the direct current power to the voltage regulation module. Specifically, the direct current power is output to a DC/DC converter module in the voltage regulation module. The voltage regulation module is configured to: regulate an output voltage, and externally output a voltage.

According to a fourth aspect, an embodiment of this application further provides a charging pile, where the charging pile includes the foregoing charging module.

Beneficial effects brought by technical solutions provided in embodiments of this application include the following.

In technical solutions provided in embodiments of this application, the series circuit and the parallel circuit are disposed between the first DC/DC converter module and the second DC/DC converter module, and the controllable switch module is disposed in each of the series circuit and the parallel circuit. In this way, when a low-voltage output is required, the parallel circuit may be conducted, and the series circuit may be disconnected; or when a high-voltage output is required, the series circuit may be conducted, and the parallel circuit may be disconnected, so that the output voltage can be regulated in a wide range. In addition, the semiconductor device module is connected in parallel between two terminals of the controllable switch module, so that the series circuit and the parallel circuit can also be conducted by using the semiconductor device module. When the controllable switch modules are all opened, the voltage regulation module is not powered off, so that seamless switching between the high-voltage output state and the low-voltage output state without power-off is implemented, charging of the electric vehicle is not interrupted, and charging experience of the electric vehicle is improved.

LEGEND DESCRIPTION

Figure 1:
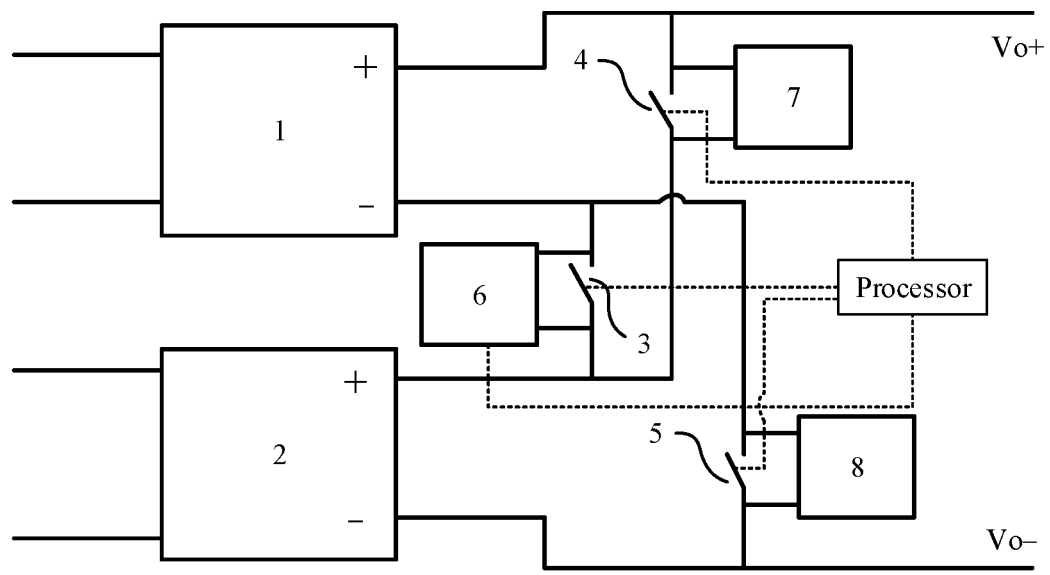
FIG. 1 is a schematic diagram of a voltage regulation module according to an embodiment of this application.
Figure 2:
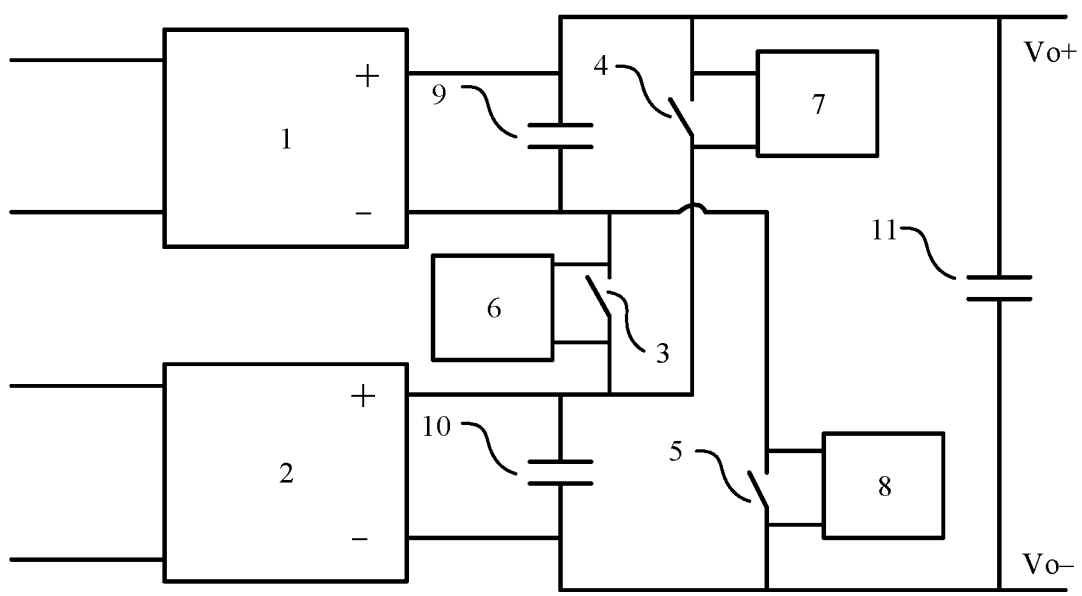
FIG. 2 is a schematic diagram of a voltage regulation module according to an embodiment of this application.

1-first DC/DC converter module, 2-second DC/DC converter module, 3-first controllable switch module, 4-second controllable switch module, 5-third controllable switch module, 6-first semiconductor device module, 7-second semiconductor device module, 8-third semiconductor device module, 9-first capacitor, 10-second capacitor, and 11-third capacitor.

DESCRIPTION OF EMBODIMENTS

Embodiments of this application provide a voltage regulation module, a charging module, and a charging pile that may be used to charge an electric vehicle. In a charging process, as a voltage of a charging battery of the electric vehicle gradually increases, an output voltage of a DC/DC converter module in the voltage regulation module is controlled to correspondingly increase. After output voltages of two DC/DC converter modules are regulated to a highest value, if a voltage requirement of the charging battery still cannot be met, the plurality of DC/DC converter modules may be switched to a series conducted state that may also be referred to as a high-voltage output state. In this application, in a switching process, seamless switching without power-off can be implemented, a charging process of the electric vehicle is not interrupted, and charging experience of the electric vehicle is improved.

An embodiment of this application provides a voltage regulation module. As shown in FIG. 1 to FIG. 7, the voltage regulation module includes a first direct current-direct current DC/DC converter module 1, a second DC/DC converter module 2, a first controllable switch module 3, a second controllable switch module 4, a third controllable switch module 5, a first semiconductor device module 6, a second semiconductor device module 7, and a third semiconductor device module 8. The first controllable switch module 3 is disposed between an output negative terminal of the first DC/DC converter module 1 and an output positive terminal of the second DC/DC converter module 2. The second controllable switch module 4 is disposed between an output positive terminal of the first DC/DC converter module 1 and the output positive terminal of the second DC/DC converter module 2. The third controllable switch module 5 is disposed between the output negative terminal of the first DC/DC converter module 1 and an output negative terminal of the second DC/DC converter module 2. The first semiconductor device module 6 is connected in parallel between two terminals of the first controllable switch module 3. The second semiconductor device module 7 is connected in parallel between two terminals of the second controllable switch module 4. The third semiconductor device module 8 is connected in parallel between two terminals of the third controllable switch module 5.

The voltage regulation module may be disposed in a charging module, and is configured to: regulate an output voltage, and externally output a voltage.

When the first DC/DC converter module 1 and the second DC/DC converter module 2 are in a series conducted state, the output positive terminal of the first DC/DC converter module 1 is an external output positive terminal of the entire voltage regulation module, and the output negative terminal of the second DC/DC converter module 2 is an external output negative terminal of the entire voltage regulation module. When the first DC/DC converter module 1 and the second DC/DC converter module 2 are in a parallel conducted state, the output positive terminals of both the first DC/DC converter module 1 and the second DC/DC converter module 2 are external output positive terminals of the voltage regulation module, and the output negative terminals of both the first DC/DC converter module 1 and the second DC/DC converter module 2 are external output negative terminals of the voltage regulation module. The external output negative terminal and the external output positive terminal may be direct external output terminals, or may be indirect external output terminals, that is, the external output negative terminal and the external output positive terminal may be connected to a component such as a fuse, a diode, a switch, and a resistor.

The output negative terminal of the first DC/DC converter module 1 may be directly or indirectly connected to the output positive terminal of the second DC/DC converter module 2 by using the first controllable switch module 3, that is, in addition to the first controllable switch module 3, another component such as a diode, a resistor, and a fuse may be further disposed between the output negative terminal of the first DC/DC converter module 1 and the output positive terminal of the second DC/DC converter module 2.

The output positive terminal of the first DC/DC converter module 1 may be directly or indirectly connected to the output positive terminal of the second DC/DC converter module 2 by using the second controllable switch module 4, that is, in addition to the second controllable switch module 4, another component such as a diode, a resistor, and a fuse may be further disposed between the output positive terminal of the first DC/DC converter module 1 and the output positive terminal of the second DC/DC converter module 2.

The output negative terminal of the first DC/DC converter module 1 may be directly or indirectly connected to the output negative terminal of the second DC/DC converter module 2 by using the third controllable switch module 5, that is, in addition to the third controllable switch module 5, another component such as a diode, a resistor, and a fuse may be further disposed between the output negative terminal of the first DC/DC converter module 1 and the output negative terminal of the second DC/DC converter module 2.

Each DC/DC converter group may include one DC/DC converter, or may include a plurality of DC/DC converters. The plurality of DC/DC converters may be connected in series, connected in parallel, or connected in series and parallel. This is not limited in this application. Connection manners and quantities of DC/DC converters included in the first DC/DC converter module 1 and the second DC/DC converter module 2 may be the same or different. It should be particularly noted that each or one DC/DC converter module may include two DC/DC converter units. The two DC/DC converter units may be connected in a connection manner between the first DC/DC converter module and the second DC/DC converter module. Connection manners and quantities of DC/DC converters included in all the DC/DC converter units may be the same or different. Each or one DC/DC converter unit may further include two DC/DC converter units, and by analogy.

A DC/DC converter may be of any isolated topology. An input structure of the DC/DC converter may not be limited, and the input structure may be a series structure, a parallel structure, or any other form. The DC/DC converter is an apparatus that is in a direct current circuit and that converts electric energy with a voltage value into electric energy with another voltage value, and can convert and regulate an input direct current voltage and then output the direct current voltage. Specifically, the DC/DC converter may include one or more of a boost converter, a buck converter, and a buck/boost converter.

A controllable switch module is a switch module that may be controlled, by using a control signal, to be closed and opened, may be a relay group or a contactor group, and may be of an alternating current type or a direct current type. Each controllable switch module may include one controllable switch, or may include a plurality of controllable switches. The plurality of controllable switches may be connected in parallel, connected in series, or connected in series and parallel. The controllable switch module is the first controllable switch module 3, the second controllable switch module 4, or the third controllable switch module 5.

The first semiconductor device module 6 is a controllable semiconductor device module. The second semiconductor device module 7 and the third semiconductor device module 8 each may be a controllable semiconductor device module, an uncontrollable semiconductor device module, or a combination of a controllable semiconductor device and an uncontrollable semiconductor device. A semiconductor device in the controllable semiconductor device module may be one or more of a silicon controlled rectifier (SCR), a metal-oxide semiconductor field-effect transistor (MOS), and an insulated gate bipolar transistor (IGBT). A semiconductor device in the uncontrollable semiconductor device module may be a diode. Each semiconductor device module may include one semiconductor device, or may include a plurality of semiconductor devices. Types of the plurality of semiconductor devices may be the same or different. The plurality of semiconductor devices may be connected in series, connected in parallel, or connected in series and parallel.

To simplify control logic, each semiconductor device module may include only one type of semiconductor device. In this case, the first semiconductor device module is a MOS transistor group, an IGBT transistor group, or an SCR group; the second semiconductor device module is a diode group, a MOS transistor group, an IGBT transistor group, or an SCR group; and the third semiconductor device module is a diode group, a MOS transistor group, an IGBT transistor group, or an SCR group.

Figure 3:
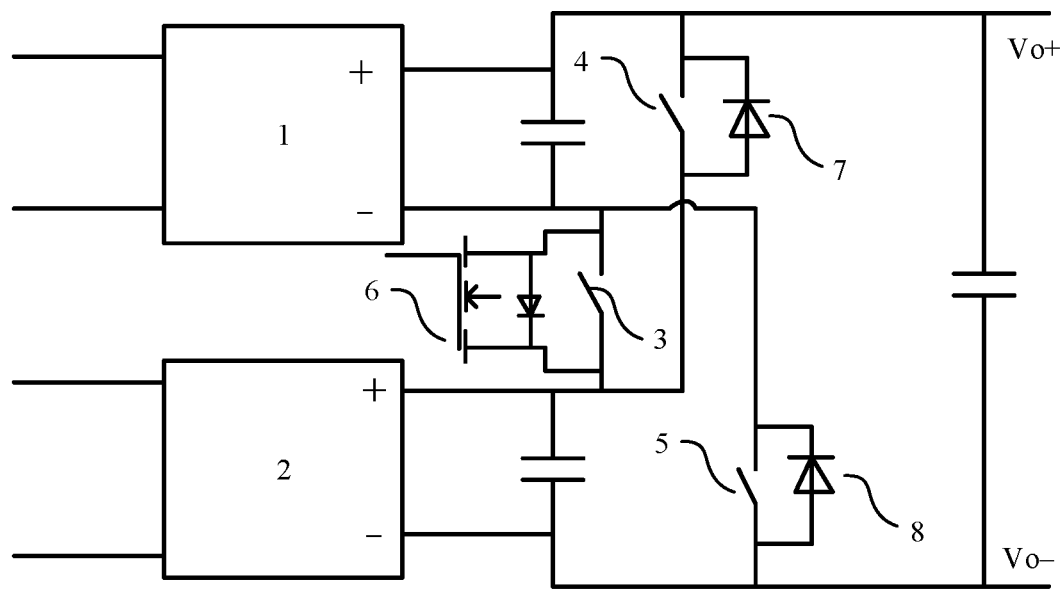
FIG. 3 is a schematic diagram of a voltage regulation module according to an embodiment of this application.
Figure 6:
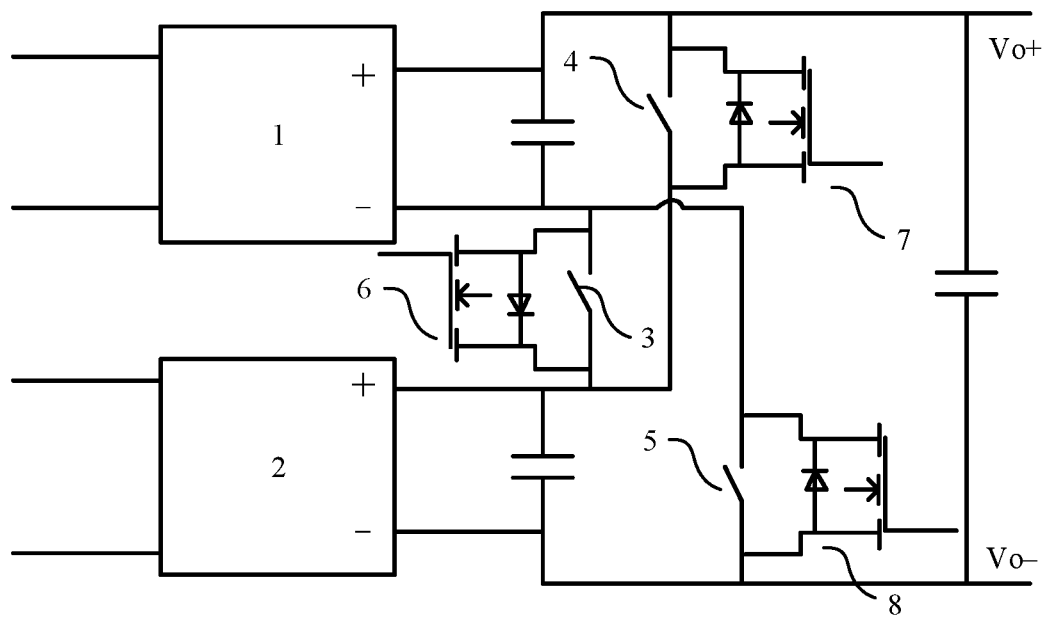
FIG. 6 is a schematic diagram of a voltage regulation module according to an embodiment of this application.

As shown by the first semiconductor device module 6 in FIG. 3 and all semiconductor device modules in FIG. 6, the MOS transistor and the IGBT transistor each include a diode. When a drive of the MOS transistor or the IGBT transistor is turned on, the MOS transistor or the IGBT transistor is in a bidirectional conductible state. When a drive of the MOS transistor or the IGBT transistor is turned off, the MOS transistor or the IGBT transistor is in a unidirectional conductible state, that is, the MOS transistor or the IGBT transistor may be conducted by using the diode in the MOS transistor or the IGBT transistor. It may be understood that, if the drives of the MOS transistor and the IGBT transistor are turned off, the MOS transistor and the IGBT transistor each may be used as a diode. Further, herein, although a MOS transistor group and an IGBT transistor group each are a controllable semiconductor device, the MOS transistor group and the IGBT transistor group may not be electrically connected to a processor. Alternatively, although the MOS transistor group and the IGBT transistor group are electrically connected to the processor, the processor does not control the MOS transistor group and the IGBT transistor group, or does not control states of the drives of the MOS transistor group and the IGBT transistor group to be changed, so that the drives of the MOS transistor group and the IGBT transistor group are always in a turn-off state.

Figure 4:
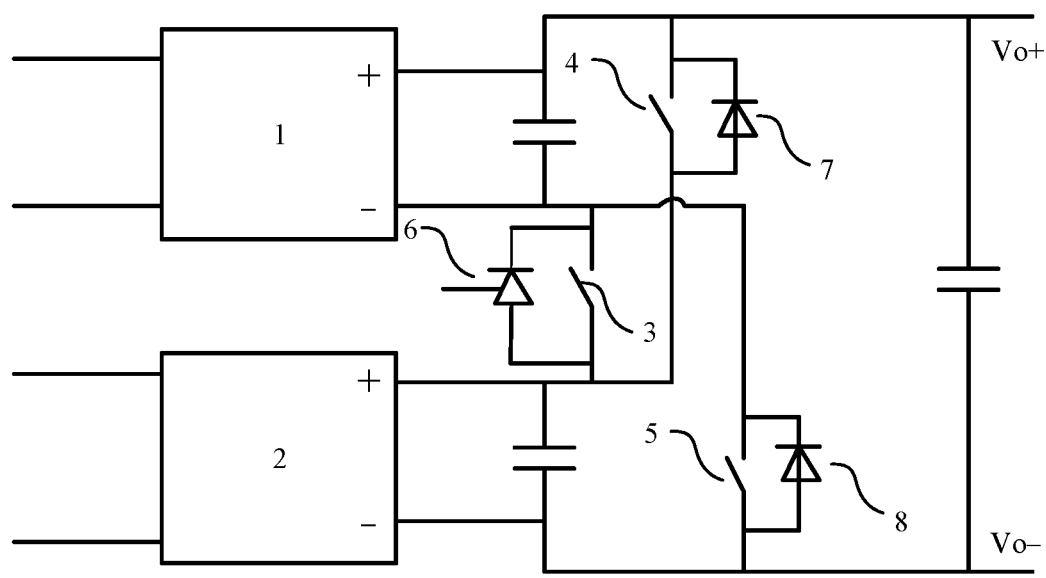
FIG. 4 is a schematic diagram of a voltage regulation module according to an embodiment of this application.
Figure 5:
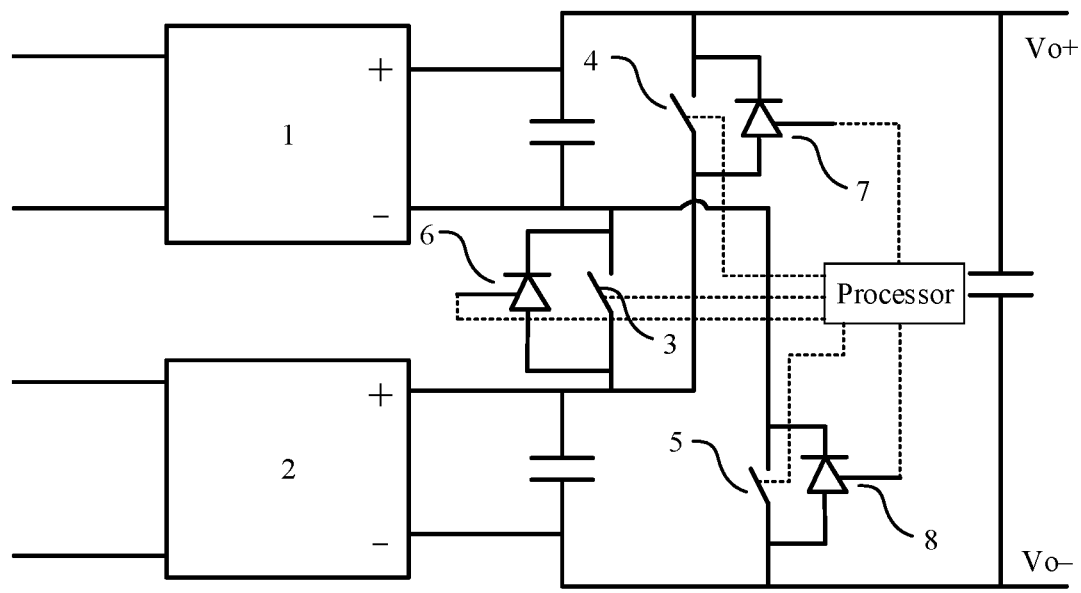
FIG. 5 is a schematic diagram of a voltage regulation module according to an embodiment of this application.

As shown by the first semiconductor device module 6 in FIG. 4 and all semiconductor device modules in FIG. 5, when a drive of the SCR is turned on, the SCR is in a unidirectional conductible state. When a drive of the SCR is turned off, the SCR is in a non-conductible state that may also be referred to as a cut-off state. It may be understood that, when the drive of the SCR is turned on, the SCR may be used as a diode. To be specific, the SCR may be electrically connected to the processor, but the processor may not control a state of the drive of the SCR to be changed, so that the drive of the SCR is always in a turn-on state.

In addition, the diode is an uncontrollable semiconductor device, and is always in a unidirectional conductible state.

A connection manner of the semiconductor device in each semiconductor device module in the voltage regulation module is as follows:

A connection manner of a controllable semiconductor device in the first semiconductor device module 6 is as follows:

As shown in FIG. 3 and FIG. 6, if the controllable semiconductor device is a MOS transistor or an IGBT transistor, an anode of a diode in the controllable semiconductor device is connected to the output negative terminal of the first DC/DC converter module 1, and a cathode of the diode in the controllable semiconductor device is connected to the output positive terminal of the second DC/DC converter module 2.

As shown in FIG. 4 and FIG. 5, if the controllable semiconductor device is an SCR, an anode of the controllable semiconductor device is connected to the output negative terminal of the first DC/DC converter module 1, and a cathode of the controllable semiconductor device is connected to the output positive terminal of the second DC/DC converter module 2.

The foregoing connection manner may implement the following effects: When a drive of the controllable semiconductor device is in a turn-off state, the first DC/DC converter module 1 and the second DC/DC converter module 2 may not be conducted by using the controllable semiconductor device. When a drive of the controllable semiconductor device is in a turn-on state, if a voltage of one terminal that is of the controllable semiconductor device and that is connected to the output positive terminal of the second DC/DC converter module 2 is greater than a voltage of the other terminal of the controllable semiconductor device, the first DC/DC converter module 1 and the second DC/DC converter module 2 are conducted by using the controllable semiconductor device.

A connection manner of a semiconductor device in the second semiconductor device module 7 is as follows:

As shown in FIG. 6, if the semiconductor device is a MOS transistor or an IGBT transistor, an anode of a diode in the semiconductor device is connected to the output positive terminal of the second DC/DC converter module 2, and a cathode of a diode in the semiconductor device is connected to the output positive terminal of the first DC/DC converter module 1.

As shown in FIG. 5, when the semiconductor device is a diode or an SCR, an anode of the semiconductor device is connected to the output positive terminal of the second DC/DC converter module 2, and a cathode of the semiconductor device is connected to the output positive terminal of the first DC/DC converter module 1.

A connection manner of a semiconductor device in the third semiconductor device module 8 is as follows:

As shown in FIG. 6, if the semiconductor device is a MOS transistor or an IGBT transistor, an anode of a diode in the semiconductor device is connected to the output negative terminal of the second DC/DC converter module 2, and a cathode of the diode in the semiconductor device is connected to the output negative terminal of the first DC/DC converter module 1.

As shown in FIG. 5, when the semiconductor device is a diode or an SCR, an anode of the semiconductor device is connected to the output negative terminal of the second DC/DC converter module 2, and a cathode of the semiconductor device is connected to the output negative terminal of the first DC/DC converter module 1.

The connection manners of the second semiconductor device module 7 and the third semiconductor device module 8 may implement the following effects.

The second semiconductor device module 7 may implement a unidirectional conducted state in which a current flows from the output positive terminal of the second DC/DC converter module 2 to the output positive terminal of the first DC/DC converter module 1. The third semiconductor device module 8 may implement a unidirectional conducted state in which a current flows from the output negative terminal of the second DC/DC converter module 2 to the output negative terminal of the first DC/DC converter module 1.

To control each semiconductor device module and each controllable switch module, the voltage regulation module further includes a processor. The processor is a control component of the voltage regulation module, and the processor is connected to the first controllable switch module 3, the second controllable switch module 4, the third controllable switch module 5, and the first semiconductor device module 6. In a switching process, the processor controls each controllable switch module and each semiconductor device module to be turned on and turned off based on a specific time sequence, so that seamless switching without power-off can be implemented.

In this embodiment of this application, when the first DC/DC converter module 1 and the second DC/DC converter module 2 are in a series conducted state, the first controllable switch module 3 is in a closed state, the second controllable switch module 4 and the third controllable switch module 5 are in an opened state, a drive of the first semiconductor device module 6 is in a turn-on state or a turn-off state, and the second semiconductor device module 7 and the third semiconductor device module 8 are in a unidirectional conductible state or a non-conductible state. When the first DC/DC converter module 1 and the second DC/DC converter module 2 are in a parallel conducted state, the second controllable switch module 4 and the third controllable switch module 5 are in a closed state, the first controllable switch module 3 is in an opened state, a drive of the first semiconductor device module 6 is in a turn-off state, and the second semiconductor device module 7 and the third semiconductor device module 8 are in a non-conductible state, a bidirectional conductible state, or a unidirectional conductible state.

In a process of switching from the parallel conducted state to the series conducted state, the following is performed:

The processor is configured to: when the second semiconductor device module 7 and the third semiconductor device module 8 are in a unidirectional conductible state or a bidirectional conductible state, control the second controllable switch module 4 and the third controllable switch module 5 to be opened; when the second controllable switch module 4 and the third controllable switch module 5 are in an opened state, and the second semiconductor device module 7 and the third semiconductor device module 8 are in a unidirectional conductible state, control the drive of the first semiconductor device module 6 to be turned on; and after the drive of the first semiconductor device module 6 is turned on, control the first controllable switch module 3 to be closed.

When the second semiconductor device module 7 and the third semiconductor device module 8 are in a unidirectional conductible state or a bidirectional conductible state, the second controllable switch module 4 and the third controllable switch module 5 are controlled to be opened. Therefore, it may be ensured that the instant that the second controllable switch module 4 and the third controllable switch module 5 are opened, a current may automatically continue to flow through each of the second semiconductor device module 7 and the third semiconductor device 8. This also enables the second controllable switch module 4 and the third controllable switch module 5 to be opened at a small voltage.

When the second controllable switch module 4 and the third controllable switch module 5 are in an opened state, and the second semiconductor device module 7 and the third semiconductor device module 8 are in a unidirectional conductible state (if the second semiconductor device module 7 and the third semiconductor device module 8 are previously in a bidirectional conductible state, switching to the unidirectional conductible state is required), the drive of the first semiconductor device module 6 is controlled to be turned on. Therefore, it may be ensured that the instant that the drive of the first semiconductor device module 6 is turned on, the first DC/DC converter module 1 and the second DC/DC converter module 2 are not short-circuited, and are immediately conducted by using the first semiconductor device module 6.

After the drive of the first semiconductor device module 6 is turned on, when the first semiconductor device module 6 is conducted, the first controllable switch module 3 is closed, so that the first DC/DC converter module 1 and the second DC/DC converter module 2 are conducted by using the first controllable switch module 3, to complete switching. This also enables the first controllable switch module 3 to be closed at a small voltage.

It should be noted that, when the second controllable switch module 4 and the third controllable switch module 5 are controlled to be opened, the second controllable switch module 4 and the third controllable switch module 5 may be simultaneously opened, or may not be simultaneously opened.

In a process of switching from the series conducted state to the parallel conducted state, the following is performed:

The processor is configured to: when the drive of the first semiconductor device module 6 is in a turn-on state, control the first controllable switch module 3 to be opened; when the first controllable switch module 3 is in an opened state, and the second semiconductor device module 7 and the third semiconductor device module 8 are in a unidirectional conductible state, control the drive of the first semiconductor device module 6 to be turned off; and after the drive of the first semiconductor device module 6 is turned off, control the second controllable switch module 4 and the third controllable switch module 5 to be closed.

When the drive of the first semiconductor device module 6 is in a turn-on state, the first controllable switch module 3 is controlled to be opened. Therefore, it may be ensured that the instant that the first controllable switch module 3 is opened, a current may automatically continue to flow through the first semiconductor device module 6. This also enables the first controllable switch module 3 to be opened at a small voltage.

When the first controllable switch module 3 is in an opened state, and the second semiconductor device module 6 and the third semiconductor device module 7 are in a unidirectional conductible state (if the second semiconductor device module 6 and the third semiconductor device module 7 are previously in a bidirectional conductible state or a non-conductible state, switching to the unidirectional conductible state is required), the drive of the first semiconductor device module 6 is controlled to be turned off. Therefore, it may be ensured that the instant that the drive of the first semiconductor device module 6 is turned off, the first DC/DC converter module 1 and the second DC/DC converter module 2 are not short-circuited, and are immediately conducted by using the second semiconductor device module 6 and the third semiconductor device module 7. Then, the second controllable switch module 4 and the third controllable switch module 5 are closed, so that the first DC/DC converter module 1 and the second DC/DC converter module 2 are conducted by using the second controllable switch module 4 and the third controllable switch module 5, to complete switching. This also enables the second controllable switch module 4 and the third controllable switch module 5 to be closed at a small voltage.

It should be noted that, when the second controllable switch module 4 and the third controllable switch module 5 are closed, the second controllable switch module 4 and the third controllable switch module 5 may be simultaneously closed, or may not be simultaneously closed.

In the foregoing switching process, a series circuit and a parallel circuit are disposed in the voltage regulation module, and a controllable switch module is disposed in each of the series circuit and the parallel circuit. In this way, when a low-voltage output is required, the parallel circuit may be conducted, and the series circuit may be disconnected; or when a high-voltage output is required, the series circuit may be conducted, and the parallel circuit may be disconnected, so that the output voltage can be regulated in a wide range.

In a process of charging the electric vehicle, a charging voltage also needs to correspondingly increase as a voltage of a charging battery of the electric vehicle gradually increases. If the first DC/DC converter module and the second DC/DC converter module in the voltage regulation module are initially in a parallel conducted state, output voltages of the two DC/DC converter modules may be controlled to increase. After the output voltage of the DC/DC converter module is regulated to a highest value, if a voltage requirement of the charging battery still cannot be met, the two DC/DC converter modules need to be switched from the parallel conducted state to the series conducted state that may also be referred to as a high-voltage output state.

According to the voltage regulation module provided in this embodiment of this application, during switching, one of the series circuit and the parallel circuit is always in a conducted state (references may be made to the foregoing switching process). Therefore, according to the voltage regulation module provided in this embodiment of this application, seamless switching without power-off can be implemented in the switching process. This improves charging experience of the electric vehicle, and improves a service life of the charging battery.

In addition, the semiconductor device module is connected in parallel between two terminals of the controllable switch module. The instant that the controllable switch module is opened, a current automatically continues to flow through the semiconductor device module. The instant that the controllable switch module is closed, a semiconductor device module connected in parallel with the controllable switch module at a previous moment is in a conducted state. Therefore, the controllable switch module is opened and closed at a small voltage. This improves a service life of the controllable switch module. In addition, due to the feature, when the controllable switch module is an alternating current relay, because the controllable switch module is opened and closed at a small voltage, sparking and arcing that occur at a large voltage in a related technology do not occur. Therefore, a cheap alternating current relay may be used instead of an expensive direct current relay, to reduce costs.

It should be noted that, that the first DC/DC converter module and the second DC/DC converter module are in a series conducted state may also mean that the voltage regulation module is in a high-voltage output state. That the first DC/DC converter module and the second DC/DC converter module are in a parallel conducted state may also mean that the voltage regulation module is in a low-voltage output state.

The following uses three specific types of each of the second semiconductor device module 7 and the third semiconductor device module 8 as examples to describe the parallel conducted state, the series conducted state, and switching between the two states of the voltage regulation module.

In a first case, the second semiconductor device module 7 and the third semiconductor device module 8 each include a diode.

When the first DC/DC converter module 1 and the second DC/DC converter module 2 are in a series conducted state, the first controllable switch module 3 is in a closed state, the second controllable switch module 4 and the third controllable switch module 5 are in an opened state, and a drive of the first semiconductor device module 6 is in a turn-on state.

When the first DC/DC converter module 1 and the second DC/DC converter module 2 are in a parallel conducted state, the first controllable switch module 3 is in an opened state, the second controllable switch module 4 and the third controllable switch module 5 are in a closed state, and a drive of the first semiconductor device module 6 is in a turn-off state.

In this embodiment of this application, when the first DC/DC converter module 1 and the second DC/DC converter group 2 are in a series conducted state, the first controllable switch module 3 is in a closed state, and the second controllable switch module 4 and the third controllable switch module 5 are in an opened state. In this case, the series circuit is conducted. In addition, because the drive of the first semiconductor device module 6 is in a turn-on state, the instant that the first controllable switch module 3 is opened, a current automatically continues to flow through the first semiconductor device module 6.

When the first DC/DC converter module 1 and the second DC/DC converter module 2 are in a parallel conducted state, the first controllable switch module 3 is in an opened state, and the second controllable switch module 4 and the third controllable switch module 5 are in a closed state. In this case, the parallel circuit is conducted. In addition, the second semiconductor device module 7 and the third semiconductor device module 8 each are a diode group. Therefore, the instant that the second controllable switch module 4 and the third controllable switch module 5 are opened, a forward voltage drop is immediately generated between two terminals of each of the second semiconductor device module 7 and the third semiconductor device module 8, and a current automatically continues to flow through each of the second semiconductor device module 7 and the third semiconductor device module 8.

The following describes a process in which the first DC/DC converter module 1 and the second DC/DC converter module 2 are switched between the series conducted state and the parallel conducted state.

In a process of switching from the parallel conducted state to the series conducted state, the processor controls the second controllable switch module 4 and the third controllable switch module 5 to be opened; after the second controllable switch module 4 and the third controllable switch module 5 are opened, controls the drive of the first semiconductor device module 6 to be turned on; and after the drive of the first semiconductor device module 6 is turned on, controls the first controllable switch module 3 to be closed.

In this embodiment of this application, when switching to the series conducted state is required, the processor first controls the second controllable switch module 4 and the third controllable switch module 5 to be opened. In this case, a forward voltage drop is generated between two terminals of each of the second semiconductor device module 7 and the third semiconductor device module 8, and a current automatically continues to flow through each of the second semiconductor device module 7 and the third semiconductor device module 8. Then, the processor controls the drive of the first semiconductor device module 6 to be turned on. In this case, the series circuit is immediately conducted by using the first semiconductor device module 6, the forward voltage drop between the two terminals of each of the second semiconductor device module 7 and the third semiconductor device module 8 disappears, and the second semiconductor device module 7 and the third semiconductor device module 8 are automatically cut off. Finally, the processor controls the first controllable switch module 3 to be closed. In this case, the series circuit is conducted by using the first controllable switch module 3, and the entire switching process is completed.

In a process of switching from the series conducted state to the parallel conducted state, the processor controls the first controllable switch module 3 to be opened; after the first controllable switch module 3 is opened, controls the drive of the first semiconductor device module 6 to be turned off; and after the drive of the first semiconductor device module 6 is turned off, controls the second controllable switch module 4 and the third controllable switch module 5 to be closed.

In this embodiment of this application, when switching to the parallel conducted state is required, the processor first controls the first controllable switch module 3 to be opened. Because the drive of the first semiconductor device module 6 is in a turn-on state, a current automatically continues to flow through the first semiconductor device module 6, and the series circuit remains in a conducted state. Then, the processor controls the drive of the first semiconductor device module 6 to be turned off. In this case, a forward voltage difference is immediately generated between two terminals of each of the second semiconductor device module 7 and the third semiconductor device module 8, and the second semiconductor device module 7 and the third semiconductor device module 8 are conducted. Finally, the processor controls the second controllable switch module 4 and the third controllable switch module 5 to be closed. In this case, the parallel circuit is conducted by using the second controllable switch module 4 and the third controllable switch module 5, and the entire switching process is completed.

In a second case, the second semiconductor device module 7 and the third semiconductor device module 8 each include at least one of a MOS transistor and an IGBT transistor.

When the first DC/DC converter module 1 and the second DC/DC converter module 2 are in a series conducted state, the first controllable switch module 3 is in a closed state, the second controllable switch module 4 and the third controllable switch module 5 are in an opened state, a drive of the first semiconductor device module 6 is in a turn-on state, and drives of the second semiconductor device module 7 and the third semiconductor device module 8 are in a turn-off state.

When the first DC/DC converter module 1 and the second DC/DC converter module 2 are in a parallel conducted state, the first controllable switch module 3 is in an opened state, the second controllable switch module 4 and the third controllable switch module 5 are in a closed state, a drive of the first semiconductor device module 6 is in a turn-off state, and drives of the second semiconductor device module 7 and the third semiconductor device module 8 are in a turn-on state.

In this embodiment of this application, when the first DC/DC converter module 1 and the second DC/DC converter group 2 are in a series conducted state, the first controllable switch module 3 is in a closed state, and the second controllable switch module 4 and the third controllable switch module 5 are in an opened state. In this case, the series circuit is conducted. In addition, because the drive of the first semiconductor device module 6 is in a turn-on state, the instant that the first controllable switch module 3 is opened, a current automatically continues to flow through the first semiconductor device module 6.

When the first DC/DC converter module 1 and the second DC/DC converter module 2 are in a parallel conducted state, the first controllable switch module 3 is in an opened state, and the second controllable switch module 4 and the third controllable switch module 5 are in a closed state. In this case, the parallel circuit is conducted. In addition, because the drives of the second semiconductor device module 7 and the third semiconductor device module 8 are in a turn-on state, the instant that the second controllable switch module 4 and the third controllable switch module 5 are opened, a current automatically continues to flow through each of the second semiconductor device module 7 and the third semiconductor device module 8. It should be noted that the semiconductor devices in the second semiconductor device module 7 and the third semiconductor device module 8 each include a diode. Therefore, even if the drives of the second semiconductor device module 7 and the third semiconductor device module 8 are in a turn-off state, the instant that the second controllable switch module 4 and the third controllable switch module 5 are opened, a current also automatically continues to flow through each of the second semiconductor device module 7 and the third semiconductor device module 8.

The following describes a process in which the first DC/DC converter module 1 and the second DC/DC converter module 2 are switched between the series conducted state and the parallel conducted state.

In a process of switching from the parallel conducted state to the series conducted state, the processor controls the second controllable switch module 4 and the third controllable switch module 5 to be opened; after the second controllable switch module 4 and the third controllable switch module 5 are opened, controls the drives of the second semiconductor device module 7 and the third semiconductor device module 8 to be turned off; after the drives of the second semiconductor device module 7 and the third semiconductor device module 8 are turned off, controls the drive of the first semiconductor device module 6 to be turned on; and after the drive of the first semiconductor device module 6 is turned on, controls the first controllable switch module 3 to be closed.

In this embodiment of this application, when switching to the series conducted state is required, the processor first controls the second controllable switch module 4 and the third controllable switch module 5 to be opened. In this case, a current automatically continues to flow through each of the second semiconductor device module 7 and the third semiconductor device module 8. Then, the processor controls the drives of the second semiconductor device module 7 and the third semiconductor device module 8 to be turned off. In this case, a current may continue to be conducted by using the diode in each of the second semiconductor device module 7 and the third semiconductor device module 8. Then, the processor controls the drive of the first semiconductor device module 6 to be turned on. In this case, the series circuit is conducted by using the first semiconductor device module 6, and the diode in each of the second semiconductor device module 7 and the third semiconductor device module 8 is automatically cut off. Finally, the processor controls the first controllable switch module 3 to be closed. In this case, the series circuit is conducted by using the first controllable switch module 3, and the entire switching process is completed.

In a process of switching from the series conducted state to the parallel conducted state, the processor controls the first controllable switch module 3 to be opened; after the first controllable switch module 3 is opened, controls the drive of the first semiconductor device module 6 to be turned off; after the drive of the first semiconductor device module 6 is turned off, controls the drives of the second semiconductor device module 7 and the third semiconductor device module 8 to be turned on; and after the drives of the second semiconductor device module 7 and the third semiconductor device module 8 are turned on, controls the second controllable switch module 4 and the third controllable switch module 5 to be closed.

In this embodiment of this application, when switching to the parallel conducted state is required, the processor first controls the first controllable switch module 3 to be opened. Because the drive of the first semiconductor device module 6 is in a turn-on state, a current automatically continues to flow through the first semiconductor device module 6, and the series circuit remains in a conducted state. Then, the processor controls the drive of the first semiconductor device module 6 to be turned off. In this case, a forward voltage difference is immediately generated between two terminals of each of the second semiconductor device module 7 and the third semiconductor device module 8, and the parallel circuit is conducted by using the diode in each of the second semiconductor device module 7 and the third semiconductor device module 8. Then, the processor controls the drives of the second semiconductor device module 7 and the third semiconductor device module 8 to be turned on. Finally, the processor controls the second controllable switch module 4 and the third controllable switch module 5 to be closed. In this case, the parallel circuit is conducted by using the second controllable switch module 4 and the third controllable switch module 5, and the entire switching process is completed.

In a third case, the second semiconductor device module 7 and the third semiconductor device module 8 each include an SCR.

When the first DC/DC converter module 1 and the second DC/DC converter module 2 are in a series conducted state, the first controllable switch module 3 is in a closed state, the second controllable switch module 4 and the third controllable switch module 5 are in an opened state, a drive of the first semiconductor device module 6 is in a turn-on state, and drives of the second semiconductor device module 7 and the third semiconductor device module 8 are in a turn-off state or a turn-on state.

When the first DC/DC converter module 1 and the second DC/DC converter module 2 are in a parallel conducted state, the first controllable switch module 3 is in an opened state, the second controllable switch module 4 and the third controllable switch module 5 are in a closed state, a drive of the first semiconductor device module 6 is in a turn-off state, and drives of the second semiconductor device module 7 and the third semiconductor device module 8 are in a turn-on state.

The following describes a process in which the first DC/DC converter module 1 and the second DC/DC converter module 2 are switched between the series conducted state and the parallel conducted state.

In a process of switching from the parallel conducted state to the series conducted state, the processor controls the second controllable switch module 4 and the third controllable switch module 5 to be opened; after the second controllable switch module 4 and the third controllable switch module 5 are opened, controls the drive of the first semiconductor device module 6 to be turned on; and after the drive of the first semiconductor device module 6 is turned on, controls the first controllable switch module 3 to be closed.

In this embodiment of this application, when switching to the series conducted state is required, the processor first controls the second controllable switch module 4 and the third controllable switch module 5 to be opened. In this case, because the drives of the second semiconductor device module 7 and the third semiconductor device module 8 are in a turn-on state, a current automatically continues to flow through each of the second semiconductor device module 7 and the third semiconductor device module 8. Then, the processor controls the drive of the first semiconductor device module 6 to be turned on. In this case, the series circuit is conducted by using the first semiconductor device module 6, and the second semiconductor device module 7 and the third semiconductor device module 8 are automatically cut off. Finally, the processor controls the first controllable switch module 3 to be closed. In this case, the series circuit is conducted by using the first controllable switch module 3, and the entire switching process is completed.

In a process of switching from the series conducted state to the parallel conducted state, switching processes are also different depending on different states of the drives of the second semiconductor device module 7 and the third semiconductor device module 8.

In a process of switching from the series conducted state to the parallel conducted state, the processor controls the first controllable switch module 3 to be opened; if the drives of the second semiconductor device module 7 and the third semiconductor device module 8 are in a turn-off state, after the first controllable switch module 3 is opened, controls the drives of the second semiconductor device module 7 and the third semiconductor device module 8 to be turned on; after the drives of the second semiconductor device module 7 and the third semiconductor device module 8 are turned on, controls the drive of the first semiconductor device module 6 to be turned off; and after the drive of the first semiconductor device module 6 is turned off, controls the second controllable switch module 3 and the third controllable switch module 4 to be closed.

Alternatively, the processor controls the first controllable switch module 3 to be opened; if the drives of the second semiconductor device module 7 and the third semiconductor device module 8 are in a turn-on state, after the first controllable switch module 3 is opened, controls the drive of the first semiconductor device module 6 to be turned off; and after the drive of the first semiconductor device module 6 is turned off, controls the second controllable switch module 7 and the third controllable switch module 8 to be closed.

In this embodiment of this application, when switching to the parallel conducted state is required, specific switching processes are also different depending on different states of the drives of the second semiconductor device module 7 and the third semiconductor device module 8.

Initially, the drives of the second semiconductor device module 7 and the third semiconductor device module 8 are in a turn-off state.

The processor first controls the first controllable switch module 3 to be opened. Because the drive of the first semiconductor device module 6 is in a turn-on state, a current automatically continues to flow through the first semiconductor device module 6, and the series circuit remains in a conducted state. Then, the processor controls the drives of the second semiconductor device module 7 and the third semiconductor device module 8 to be turned on. In this case, because the drive of the first semiconductor device module 6 is turned on, the series circuit remains in a conducted state. Then, the processor controls the drive of the first semiconductor device module 6 to be turned off. In this case, a forward voltage difference is immediately generated between two terminals of each of the second semiconductor device module 7 and the third semiconductor device module 8, and the second semiconductor device module 7 and the third semiconductor device module 8 are immediately conducted. Finally, the processor controls the second controllable switch module 4 and the third controllable switch module 5 to be closed. In this case, the parallel circuit is conducted by using the second controllable switch module 4 and the third controllable switch module 5, and the entire switching process is completed.

Initially, the drives of the second semiconductor device module 7 and the third semiconductor device module 8 are in a turn-on state.

The processor first controls the first controllable switch module 3 to be opened. Because the drive of the first semiconductor device module 6 is in a turn-on state, a current automatically continues to flow through the first semiconductor device module 6, and the series circuit remains in a conducted state. Then, the processor controls the drive of the first semiconductor device module 6 to be turned off. In this case, a forward voltage difference is immediately generated between two terminals of each of the second semiconductor device module 7 and the third semiconductor device module 8, and the second semiconductor device module 7 and the third semiconductor device module 8 are conducted. Finally, the processor controls the second controllable switch module 4 and the third controllable switch module 5 to be closed. In this case, the parallel circuit is conducted by using the second controllable switch module 4 and the third controllable switch module 5, and the entire switching process is completed.

It should be noted that opening and closing of each switch module and turn-on and turn-off of the drive of each semiconductor device module mean that a corresponding action is completed for a corresponding component, and do not mean sending a control signal. For example, after the drive of the first semiconductor device module 6 is turned off, closing the second controllable switch module 7 and the third controllable switch module 8 means that the second controllable switch module 7 and the third controllable switch module 8 are closed after the drive of the first semiconductor device module 6 is in turn-off state, and does not mean sending a drive turn-off signal before a switch close signal. Actually, due to a delay of an action of the controllable switch module, if the drive turn-off signal and the switch close signal are simultaneously sent (or even the switch close signal is sent earlier than the drive turn-off signal), the drive can also be turned on before the switch module is closed.

In addition, to better implement a direct current output of the voltage regulation module, the voltage regulation module may further include a first capacitor 9 and a second capacitor 10, two terminals of the first capacitor 9 are respectively connected to the output positive terminal and the output negative terminal of the first DC/DC converter module 1, and two terminals of the second capacitor 10 are respectively connected to the output positive terminal and the output negative terminal of the second DC/DC converter module 2.

The voltage regulation module may further include a third capacitor 11, and two terminals of the third capacitor 11 are respectively connected to the output positive terminal of the first DC/DC converter module 1 and the output negative terminal of the second DC/DC converter module 2.

The first capacitor 9, the second capacitor 10, and the third capacitor 11 are disposed, so that rectification and filtering can be performed, and some alternating current components in direct current power that is output by the DC/DC converter module can be filtered out. Therefore, the output voltage is more stable, and charging experience of the electric vehicle is improved.

Figure 7:
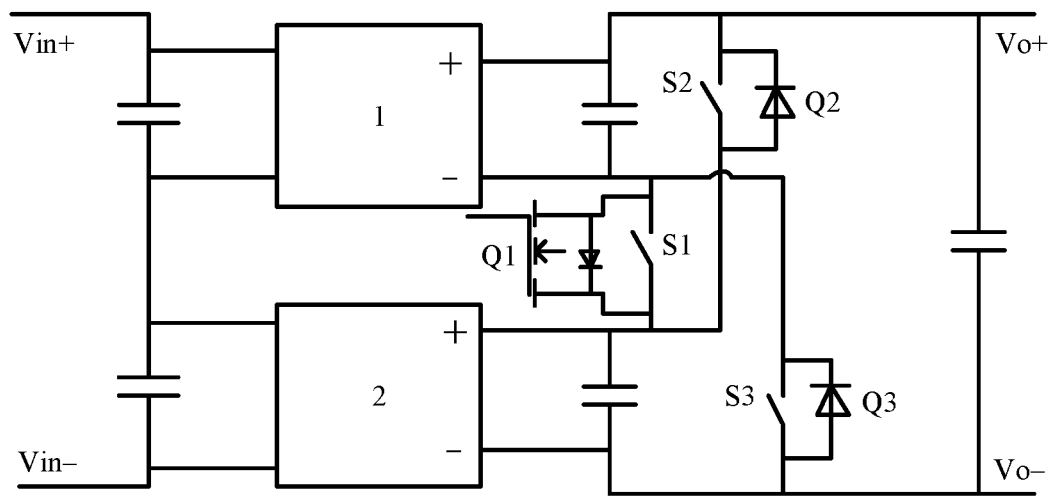
FIG. 7 is a schematic diagram of a voltage regulation module according to an embodiment of this application.

The following describes the voltage regulation module in detail by using a specific example. As shown in FIG. 7, the voltage regulation module includes a first DC/DC converter module 1 and a second DC/DC converter module 2, and the two DC/DC converter modules are of an LLC topology. Inputs of the two DC/DC converter modules are a double bus with ±400 volts. Two groups of capacitors are connected in series on the double bus bus. Parameters of the first DC/DC converter module 1 and the second DC/DC converter module 2 are the same, and an output capability of each DC/DC converter module is a constant power of 250 volts to 500 volts.

A first controllable switch module, a second controllable switch module, and a third controllable switch module each are an alternating current relay group, and are respectively represented by S1, S2, and S3. A first semiconductor device module is an IGBT transistor group or a MOS transistor group, and is represented by Q1. A second semiconductor device module and a third semiconductor device module each are a high-frequency diode group, and are represented by Q2 and Q3. A circuit connection manner of the voltage regulation module is shown in FIG. 7.

When the voltage regulation module is in a high-voltage output state, S1 is in a closed state, a drive of Q1 is in a turn-on state, and S2 and S3 are in an opened state. In this case, output voltages of the two DC/DC converter modules are regulated, so that a constant power of 500 volts to 1000 volts can be output.

When the voltage regulation module is in a low-voltage output state, S1 is in an opened state, a drive of Q1 is in a turn-off state, and S2 and S3 are in a closed state. In this case, output voltages of the two DC/DC converter modules are regulated, so that a constant power of 250 volts to 500 volts can be output.

With a combination of the high-voltage output state and the low-voltage output state, the voltage regulation module can output a constant power of 250 volts to 1000 volts, and can be compatible with fast charging power requirements of all electric vehicles on the market.

A voltage existing during switching between the high-voltage output state and the low-voltage output state is 500 volts. When the voltage is regulated to be greater than or less than the voltage of 500 volts, switching between a series circuit and a parallel circuit needs to be performed. With a unique control logic time sequence, seamless switching can be implemented, and the voltage regulation module is not powered off in short time.

A control logic time sequence for switching from the low-voltage output state (which may also be referred to as a parallel conducted state) to the high-voltage output state (which may also be referred to as a series conducted state) is as follows: Initially, S1 is in an opened state, the drive of Q1 is in a turn-off state, and S2 and S3 are in a closed state. When switching is required, S2 and S3 are controlled to be opened, Q2 and Q3 work seamlessly. After S2 and S3 are opened, the drive of Q1 is controlled to be turned on, so that a current flows through Q1, and Q2 and Q3 are automatically cut off. Then, S1 is controlled to be closed, to complete a switching action.

A control logic time sequence for switching from the high-voltage output state to the low-voltage output state is as follows: Initially, S1 is in a closed state, the drive of Q1 is in a turn-on state, and S2 and S3 are in an opened state. When switching is required, S1 is controlled to be opened, and Q1 works seamlessly. Then, the drive of Q1 is controlled to be turned off. In this case, a current automatically continues to flow through each of Q2 and Q3. Finally, S1 and S3 are controlled to be closed, to complete a switching action.

Figure 8:
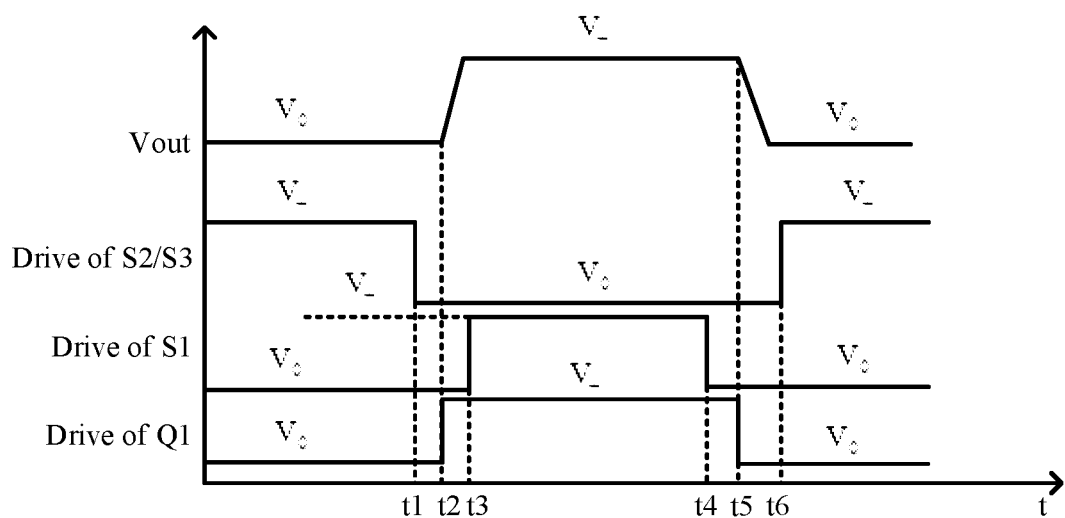
FIG. 8 is a schematic diagram of a switching process of a voltage regulation module according to an embodiment of this application.

For the control logic time sequence for switching, refer to FIG. 8. In Vout, a high level represents the high-voltage output state, a low level represents the low-voltage output state. When drives of S1 and S2/S3 are at a high level, it indicates that the controllable switch module is in a closed state. When drives of S1 and S2/S3 are at a low level, it indicates that the controllable switch module is in an opened state. When the drive of Q1 is at a high level, it indicates that the drive of Q1 is in a turn-on state, and a current may normally pass through Q1. When the drive of Q1 is at a low level, it indicates that the drive of Q1 is in a turn-off state, and a current may not normally pass through Q1. In FIG. 8, V+ represents the high level, $V_0$ represents the low level, and V+ and $V_0$ are only used to distinguish between the high and level and the low level.

The voltage regulation module provided in this embodiment of this application has low costs, and a continuous constant power in an ultra-wide range can be implemented. In an entire range of a constant power of 250 volts to 1000 volts, the voltage regulation module can perform continuous regulation without interruption, and is compatible with fast charging requirements of all vehicle types on the market. In addition, control logic is simplified, and product availability is improved.

Figure 9:
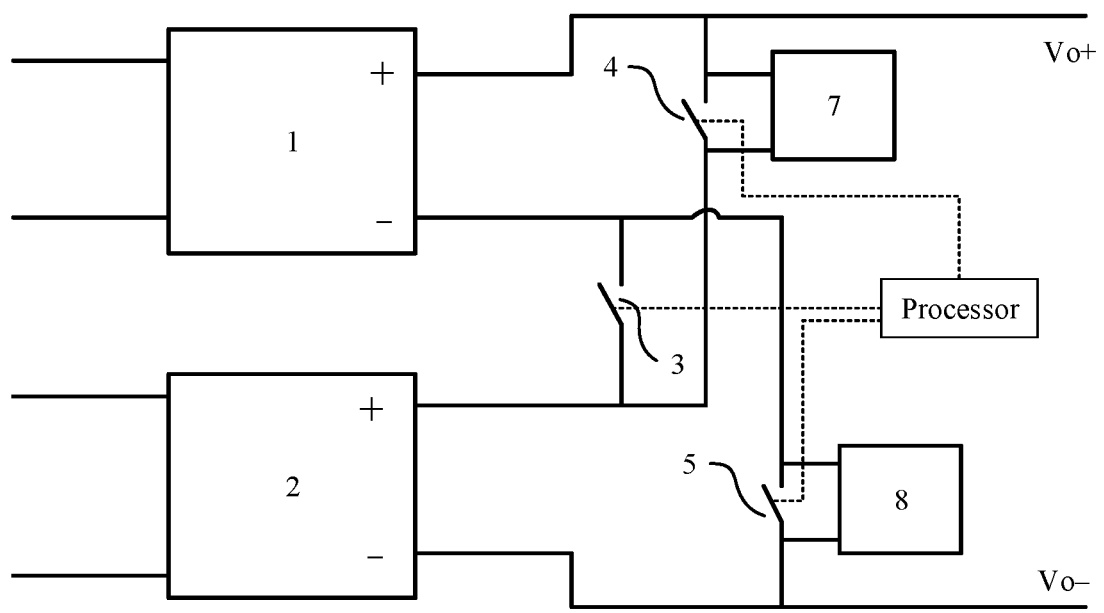
FIG. 9 is a schematic diagram of a voltage regulation module according to an embodiment of this application.

As shown in FIG. 9, an embodiment of this application further provides a voltage regulation module, including a first DC/DC converter module 1, a second DC/DC converter module 2, a first controllable switch module 3, a second controllable switch module 4, a third controllable switch module 5, a second semiconductor device module 6, and a third semiconductor device module 7. An output negative terminal of the first DC/DC converter module 1 is connected to an output positive terminal of the second DC/DC converter module 2 by using the first controllable switch module 3. An output positive terminal of the first DC/DC converter module 1 is connected to the output positive terminal of the second DC/DC converter module 2 by using the second controllable switch module 4. The output negative terminal of the first DC/DC converter module 1 is connected to an output negative terminal of the second DC/DC converter module 2 by using the third controllable switch module 5. The second semiconductor device module 7 is connected in parallel between two terminals of the second controllable switch module 4. The third semiconductor device module 8 is connected in parallel between two terminals of the third controllable switch module 5.

For descriptions of components in the voltage regulation module, refer to descriptions of corresponding components in the voltage regulation module provided above. Details are not described herein again. For a connection manner of each component, refer to content of the voltage regulation module provided above.

The voltage regulation module provided in this embodiment may be understood as being obtained after the first semiconductor device module 6 is removed from any voltage regulation module provided in the foregoing embodiment.

In this embodiment of this application, compared with the switching process of the voltage regulation module provided in the foregoing embodiment, the voltage regulation module provided in this embodiment lacks the first semiconductor device group. Therefore, in a process of switching between a series state and a parallel state, an action of the first semiconductor device module 6 in the voltage regulation module provided in the foregoing embodiment may be removed, to obtain a state change process of each component in the switching process of the voltage regulation module provided in this embodiment.

The voltage regulation module provided in this embodiment of this application may be used in a charging module to regulate an output voltage. A series circuit and a parallel circuit are disposed in the voltage regulation module, and a controllable switch module is disposed in each of the series circuit and the parallel circuit. In this way, when a low-voltage output is required, the parallel circuit may be conducted, and the series circuit may be disconnected; or when a high-voltage output is required, the series circuit may be conducted, and the parallel circuit may be disconnected, so that the output voltage can be regulated in a wide range.

In addition to the field of charging technologies of electric vehicles, the voltage regulation module provided in this embodiment of this application may be further applied to another charging apparatus to charge another terminal, for example, applied to a charger of a terminal such as a mobile phone or a computer.

According to the voltage regulation module provided in this embodiment of this application, in a process of switching from the series conducted state to the parallel conducted state, when the second semiconductor device module 7 and the third semiconductor device module 8 are in a unidirectional conductible state, the first controllable switch module 3 may be opened. In this case, a forward voltage drop is immediately generated between two terminals of each of the second semiconductor device module 7 and the third semiconductor device module 8, and the parallel circuit is immediately conducted by using the second semiconductor device module 7 and the third semiconductor device module 8. Then, the second controllable switch group 4 and the third controllable switch group 5 are closed, to complete switching.

In a switching process of switching from the parallel conducted state to the series conducted state, when the second semiconductor device module 7 and the third semiconductor device module 8 are in a unidirectional conductible state, the second controllable switch module 4 and the third controllable switch module 5 are opened. In this case, a forward voltage drop is immediately generated between two terminals of each of the second semiconductor device module 7 and the third semiconductor device module 8, and the parallel circuit is conducted by using the second semiconductor device module 7 and the third semiconductor device module 8. Then, the first controllable switch module 3 is closed. In this case, the forward voltage drop generated between the two terminals of each of the second semiconductor device module 7 and the third semiconductor device module 8 disappears, and the series circuit is immediately conducted by using the first controllable switch module 3, to complete switching.

It may be learned that, in the foregoing switching process, one of the series circuit and the parallel circuit is always in a conducted state. Therefore, according to the voltage regulation module provided in this embodiment of this application, seamless switching without power-off can be implemented in the switching process. This improves charging experience of the electric vehicle.

In addition, the second semiconductor device module 7 and the third semiconductor device module 8 are respectively connected in parallel between two terminals of the second controllable switch module 4 and two terminals of the third controllable switch module 5. The instant that the controllable switch module is opened, a current automatically continues to flow through the semiconductor device module. The instant that the controllable switch module is closed, a semiconductor device module connected in parallel with the controllable switch module at a previous moment is in a conducted state. Therefore, the second controllable switch module 4 and the third controllable switch module 5 are opened and closed at a small voltage. This improves a service life of each of the second controllable switch module 4 and the third controllable switch module 5. In addition, due to the feature, when the second controllable switch module 4 and the third controllable switch module 5 each are an alternating current relay, because the second controllable switch module and the third controllable switch module are opened and closed at a small voltage, sparking and arcing that occur at a large voltage in a related technology do not occur. Therefore, a cheap alternating current relay may be used instead of an expensive direct current relay, to reduce costs.

When the first DC/DC converter module 1 and the second DC/DC converter module 2 each include a diode, the following case exists:

When the voltage regulation module is in a series conducted state, the first controllable switch module 3 is in a closed state, and the second controllable switch module 4 and the third controllable switch module 5 are in an opened state. When the voltage regulation module is in a parallel conducted state, the first controllable switch module 3 is in an opened state, and the second controllable switch module 4 and the third controllable switch module 5 are in a closed state.

In a process of switching from the parallel conducted state to the series conducted state, the second controllable switch module 4 and the third controllable switch module 5 are controlled to be opened. In this case, a current automatically continues to flow through each of the second semiconductor device group 7 and the third semiconductor device group 8. After the second controllable switch module 4 and the third controllable switch module 5 are opened, the first controllable switch module 3 is closed.

In a process of switching from the series conducted state to the parallel conducted state, the first controllable switch module 3 is controlled to be opened. In this case, the second semiconductor device group 7 and the third semiconductor device group 8 are immediately conducted. After the first controllable switch module 3 is opened, the second controllable switch module 4 and the third controllable switch module 5 are closed.

When the second semiconductor device module 7 includes at least one of a MOS transistor and an IGBT transistor, and the third semiconductor device module 8 includes at least one of a MOS transistor and an IGBT transistor, the following case exists:

When the voltage regulation module is in a series conducted state, the first controllable switch module 3 is in a closed state, the second controllable switch module 4 and the third controllable switch module 5 are in an opened state, and drives of the second semiconductor device module 7 and the third semiconductor device module 8 are in a turn-off state. When the voltage regulation module is in a parallel conducted state, the first controllable switch module 3 is in an opened state, the second controllable switch module 4 and the third controllable switch module 5 are in a closed state, and drives of the second semiconductor device module 7 and the third semiconductor device module 8 are in a turn-on state.

In a process of switching from the parallel conducted state to the series conducted state, the second controllable switch module 4 and the third controllable switch module 5 are enabled to be opened. After the second controllable switch module 4 and the third controllable switch module 5 are opened, the drives of the second semiconductor device module 7 and the third semiconductor device module 8 are enabled to be turned off. After the drives of the second semiconductor device module 7 and the third semiconductor device module 8 are turned off, the first controllable switch module 3 is enabled to be closed.

In a process of switching from the series conducted state to the parallel conducted state, the first controllable switch module 3 is enabled to be opened. After the first controllable switch module 3 is opened, the drives of the second semiconductor device module 7 and the third semiconductor device module 8 are enabled to be turned on. After the drives of the second semiconductor device module 7 and the third semiconductor device module 8 are turned on, the second controllable switch module 4 and the third controllable switch module 5 are enabled to be closed.

When the second semiconductor device module 7 and the third semiconductor device module 8 each include an SCR, the following case exists:

When the first DC/DC converter module 1 and the second DC/DC converter module 2 are in a series conducted state, the first controllable switch module 3 is in a closed state, the second controllable switch module 4 and the third controllable switch module 5 are in an opened state, and drives of the second semiconductor device module 6 and the third semiconductor device module 7 are in a turn-off state or a turn-on state. When the first DC/DC converter module 1 and the second DC/DC converter module 2 are in a parallel conducted state, the first controllable switch module 3 is in an opened state, the second controllable switch module 4 and the third controllable switch module 5 are in a closed state, and drives of the second semiconductor device module 6 and the third semiconductor device module 8 are in a turn-on state.

In a process of switching from the parallel conducted state to the series conducted state, the second controllable switch module 4 and the third controllable switch module 5 are enabled to be opened. After the second controllable switch module 4 and the third controllable switch module 5 are opened, the first controllable switch module is enabled to be closed.

In a process of switching from the series conducted state to the parallel conducted state, the first controllable switch module 3 is enabled to be opened. If the drives of the second semiconductor device module 7 and the third semiconductor device module 8 are in a turn-off state, after the first controllable switch module 3 is opened, the drives of the second semiconductor device module 4 and the third semiconductor device module 5 are enabled to be turned on. After the drives of the second semiconductor device module 7 and the third semiconductor device module 8 are turned on, the second controllable switch module 4 and the third controllable switch module 5 are enabled to be closed.

Alternatively, in a process of switching from the series conducted state to the parallel conducted state, the first controllable switch module 3 is enabled to be opened. If the drives of the second semiconductor device module 7 and the third semiconductor device module 8 are in a turn-on state, after the first controllable switch module 3 is opened, the second controllable switch module 4 and the third controllable switch module 5 are enabled to be closed.

An embodiment of this application further provides a charging module, where the charging module includes the voltage regulation module according to any one of the foregoing embodiments.

The charging module may be applied to a charging pile of an electric vehicle, or may be applied to another charging apparatus, for example, may be applied to a charger of a terminal such as a mobile phone or a computer.

In this embodiment of this application, the charging module may include the voltage regulation module and an alternating current-direct current conversion module. The alternating current-direct current conversion module is configured to: convert alternating current power into direct current power, and output the direct current power to the voltage regulation module. Specifically, the direct current power is output to a DC/DC converter module in the voltage regulation module. The voltage regulation module is configured to: externally output a voltage, and regulate an output voltage.

An embodiment of this application further provides a charging pile, where the charging pile includes the foregoing charging module.

The charging pile may be a charging pile of an electric vehicle.

The foregoing description describes exemplary embodiments of this application, but is not intended to limit this application. Any modification, equivalent replacement, or improvement made without departing from the principles of this application may fall within the protection scope of this application.

What is claimed is:

1. A voltage regulation system, comprising:
   a first direct current-direct current (DC/DC) converter;
   a second DC/DC converter;
   a first controllable switch;
   a second controllable switch;
   a third controllable switch;
   a first semiconductor device, wherein the first semiconductor device comprises at least one of a metal-oxide semiconductor field-effect (MOS) transistor, an insulated gate bipolar transistor (IGBT), or a silicon controlled rectifier (SCR);
   a second semiconductor device, wherein the second semiconductor device comprises at least one of a diode, a MOS transistor, an IGBT transistor, or an SCR; and
   a third semiconductor device, wherein the third semiconductor device comprises at least one of a diode, a MOS transistor, an IGBT transistor, or an SCR;
   wherein an output negative terminal of the first DC/DC converter is connected to an output positive terminal of the second DC/DC converter via the first controllable switch;
   wherein an output positive terminal of the first DC/DC converter is connected to the output positive terminal of the second DC/DC converter via the second controllable switch, and the output negative terminal of the first DC/DC converter is connected to an output negative terminal of the second DC/DC converter via the third controllable switch; and
   wherein the first semiconductor device is connected in parallel between two terminals of the first controllable switch, the second semiconductor device is connected in parallel between two terminals of the second controllable switch, and the third semiconductor device is connected in parallel between two terminals of the third controllable switch;
   wherein the voltage regulation system further comprises a processor configured to switch the voltage regulation system between a first state in which the first and second DC/DC converters are connected in series and a second state in which the first and second DC/DC converters are connected in parallel;
   wherein in the first state:
      the first controllable switch is in a closed state,
      the second and third controllable switches are in an open state,
      a drive of the first semiconductor device is in a turn-on state or a turn-off state, and
      the second semiconductor device and the third semiconductor device are in a non-conductible state or a unidirectional conductible state; and
   wherein in the second state:
      the second controllable switch and the third controllable switch are in a closed state,
      the first controllable switch is in an opened state,
      the drive of the first semiconductor device is in a turn-off state, and
      the second and third semiconductor devices are each in a non-conductible state, a bidirectional conductible state, or a unidirectional conductible state; and
   wherein switching from the second state to the first state comprises:
      based on the second and third semiconductor devices each being in a unidirectional conductible state or a bidirectional conductible state, controlling the second controllable switch and the third controllable switch to be opened;
      based on the second controllable switch and the third controllable switch having been opened, and based on the second and third semiconductor devices each being in a unidirectional conductible state, controlling the drive of the first semiconductor device module to be turned on; and
      after the drive of the first semiconductor device is turned on, controlling the first controllable switch to be closed.

2. The voltage regulation system according to claim 1, wherein the first semiconductor device comprises a MOS transistor or an IGBT transistor, an anode of a diode in the MOS transistor or the IGBT transistor is connected to the output negative terminal of the first DC/DC converter, and a cathode of the diode in the MOS transistor or the IGBT transistor is connected to the output positive terminal of the second DC/DC converter; or
   wherein the first semiconductor device comprises an SCR, an anode of the SCR is connected to the output negative terminal of the first DC/DC converter, and a cathode of the SCR is connected to the output positive terminal of the second DC/DC converter.

3. The voltage regulation system according to claim 1, wherein the second semiconductor device comprises a MOS transistor or an IGBT transistor, an anode of a diode in the MOS transistor or the IGBT transistor is connected to the output positive terminal of the second DC/DC converter, and a cathode of the diode in the MOS transistor or the IGBT transistor is connected to the output positive terminal of the first DC/DC converter; or
   wherein the second semiconductor device comprises a diode or an SCR, an anode of the diode or the SCR is connected to the output positive terminal of the second DC/DC converter, and a cathode of the diode or the SCR is connected to the output positive terminal of the first DC/DC converter.

4. The voltage regulation system according to claim 1, wherein the third semiconductor device comprises a MOS transistor or an IGBT transistor, an anode of a diode in the MOS transistor or the IGBT transistor is connected to the output negative terminal of the second DC/DC converter, and a cathode of the diode in the MOS transistor or the IGBT transistor is connected to the output negative terminal of the first DC/DC converter; or
   wherein the third semiconductor device comprises a diode or an SCR, an anode of the diode or the SCR is connected to the output negative terminal of the second DC/DC converter, and a cathode of the diode or the SCR is connected to the output negative terminal of the first DC/DC converter.

5. The voltage regulation system according to claim 1, wherein switching from the first state to the second state comprises:
   based on the drive of the first semiconductor device being in a turn-on state, controlling the first controllable switch to be opened;
   based on the first controllable switch having been opened, and the second semiconductor device and the third semiconductor device being in a unidirectional conductible state, controlling the drive of the first semiconductor device to be turned off; and
   after the drive of the first semiconductor device is turned off, controlling the second and third controllable switches to be closed.

6. The voltage regulation system according to claim 1, wherein
   the second semiconductor device and the third semiconductor device each comprise a diode; and
   wherein:
      based on the first DC/DC converter and the second DC/DC converter being in a series conducted state, the first controllable switch is in a closed state, the second controllable switch and the third controllable switch are in an opened state, and a drive of the first semiconductor device is in a turn-on state; or
      based on the first DC/DC converter and the second DC/DC converter being in a parallel conducted state, the first controllable switch is in an opened state, the second controllable switch and the third controllable switch are in a closed state, and a drive of the first semiconductor device is in a turn-off state.

7. The voltage regulation system according to claim 6, wherein the processor is further configured to:
   in a process in which the first DC/DC converter and the second DC/DC converter are switched from the parallel conducted state to the series conducted state, enable the second controllable switch and the third controllable switch to be opened;
   after the second controllable switch and the third controllable switch are opened, enable the drive of first semiconductor device to be turned on; and
   after the drive of the first semiconductor device is turned on, enable the first controllable switch to be closed.

8. The voltage regulation system according to claim 6, wherein the processor is further configured to:
   in a process in which the first DC/DC converter and the second DC/DC converter are switched from the series conducted state to the parallel conducted state, enable the first controllable switch to be opened;
   after the first controllable switch is opened, enable the drive of the first semiconductor device to be turned off; and
   after the drive of the first semiconductor device is turned off, enable the second controllable switch and the third controllable switch to be closed.

9. The voltage regulation system according to claim 1, wherein the second semiconductor device comprises at least one of a metal-oxide semiconductor field-effect (MOS) transistor or an insulated gate bipolar transistor (IGBT) transistor, and the third semiconductor device comprises at least one of a MOS transistor or an IGBT transistor; and
   wherein:
      based on the first DC/DC converter and the second DC/DC converter being in a series conducted state, the first controllable switch is in a closed state, the second controllable switch and the third controllable switch are in an opened state, a drive of the first semiconductor device is in a turn-on state, and drives of the second semiconductor device and the third semiconductor device are in a turn-off state; or
      based on the first DC/DC converter and the second DC/DC converter being in a parallel conducted state, the first controllable switch is in an opened state, the second controllable switch and the third controllable switch are in a closed state, a drive of the first semiconductor device is in a turn-off state, and drives of the second semiconductor device and the third semiconductor device are in a turn-on state.

10. The voltage regulation system according to claim 9, wherein the processor is further configured to:
    in a process in which the first DC/DC converter and the second DC/DC converter are switched from the parallel conducted state to the series conducted state, enable the second controllable switch and the third controllable switch to be opened;
    after the second controllable switch and the third controllable switch are opened, enable the drives of the second semiconductor device and the third semiconductor device to be turned off;
    after the drives of the second semiconductor device and the third semiconductor device are turned off, enable the drive of the first semiconductor device to be turned on; and
    after the drive of the first semiconductor device is turned on, enable the first controllable switch to be closed.

11. The voltage regulation system according to claim 9, wherein the processor is further configured to:
    in a process in which the first DC/DC converter and the second DC/DC converter are switched from the series conducted state to the parallel conducted state, enable the first controllable switch to be opened;
    after the first controllable switch is opened, enable the drive of the first semiconductor device to be turned off;

after the drive of first semiconductor device is turned off, enable the drives of the second semiconductor device and the third semiconductor device to be turned on; and after the drives of the second semiconductor device and the third semiconductor device are turned on, enable the second controllable switch and the third controllable switch to be closed.

12. The voltage regulation system according to claim 1, wherein the second semiconductor device and the third semiconductor device each comprise a silicon controlled rectifier (SCR) transistor; and wherein:
based on the first DC/DC converter and the second DC/DC converter being in a series conducted state, the first controllable switch is in a closed state, the second controllable switch and the third controllable switch are in an opened state, a drive of the first semiconductor device is in a turn-on state, and drives of the second semiconductor device and the third semiconductor device are in a turn-off state or a turn-on state; or based on the first DC/DC converter and the second DC/DC converter being in a parallel conducted state, the first controllable switch is in an opened state, the second controllable switch and the third controllable switch are in a closed state, a drive of the first semiconductor device is in a turn-off state, and drives of the second semiconductor device and the third semiconductor device are in a turn-on state.

13. The voltage regulation system according to claim 12, wherein the processor is further configured to:

in a process in which the first DC/DC converter and the second DC/DC converter are switched from the parallel conducted state to the series conducted state, enable the second controllable switch and the third controllable switch to be opened;

after the second controllable switch and the third controllable switch are opened, enable the drive of first semiconductor device to be turned on; and after the drive of the first semiconductor device is turned on, enable the first controllable switch to be closed.

14. The voltage regulation system according to claim 12, wherein the processor is further configured to:

in a process in which the first DC/DC converter and the second DC/DC converter are switched from the series conducted state to the parallel conducted state, enable the first controllable switch to be opened;

based on the drives of the second semiconductor device and the third semiconductor device being in a turn-off state, after the first controllable switch is opened, enable the drives of the second semiconductor device and the third semiconductor device to be turned on;

after the drives of the second semiconductor device and the third semiconductor device are turned on, enable the drive of the first semiconductor device to be turned off; and after the drive of the first semiconductor device is turned off, enable the second controllable switch and the third controllable switch to be closed; or wherein the processor is further configured to:
enable the first controllable switch to be opened;
based on the drives of the second semiconductor device and the third semiconductor device are in a turn-on state, after the first controllable switch is opened, enable the drive of the first semiconductor device to be turned off; and after the drive of the first semiconductor device is turned off, enable the second controllable switch and the third controllable switch to be closed.

15. The voltage regulation system according to claim 1, wherein the voltage regulation system further comprises a first capacitor and a second capacitor, two terminals of the first capacitor are respectively connected to the output positive terminal and the output negative terminal of the first DC/DC converter, and two terminals of the second capacitor are respectively connected to the output positive terminal and the output negative terminal of the second DC/DC converter.

16. The voltage regulation system according to claim 15, wherein the voltage regulation system further comprises a third capacitor, and two terminals of the third capacitor are respectively connected to the output positive terminal of the first DC/DC converter and the output negative terminal of the second DC/DC converter.

17. A voltage regulation system, comprising:
a first direct current-direct current (DC/DC) converter;
a second DC/DC converter;
a first controllable switch;
a second controllable switch;
a third controllable switch;
a second semiconductor device, wherein the second semiconductor device comprises at least one of a metal-oxide semiconductor field-effect (MOS) transistor, an insulated gate bipolar transistor (IGBT), or a silicon controlled rectifier (SCR); and
a third semiconductor device, wherein the third semiconductor device comprises at least one of a diode, a MOS transistor, an IGBT transistor, or an SCR;
wherein an output negative terminal of the first DC/DC converter is connected to an output positive terminal of the second DC/DC converter via the first controllable switch;
wherein an output positive terminal of the first DC/DC converter is connected to the output positive terminal of the second DC/DC converter via the second controllable switch, and the output negative terminal of the first DC/DC converter is connected to an output negative terminal of the second DC/DC converter via the third controllable switch; and
wherein the second semiconductor device is connected in parallel with two terminals of the second controllable switch, and the third semiconductor device is connected in parallel with two terminals of the third controllable switch;
wherein the voltage regulation system further comprises a processor configured to switch the voltage regulation system between a first state in which the first and second DC/DC converters are connected in series and a second state in which the first and second DC/DC converters are connected in parallel;
wherein in the first state:
the first controllable switch is in a closed state,
the second and third controllable switches are in an open state, and
the second semiconductor device and the third semiconductor device are in a non-conductible state or a unidirectional conductible state; and
wherein in the second state:
the second controllable switch and the third controllable switch are in a closed state,
the first controllable switch is in an opened state, and the second and third semiconductor devices are each in a non-conductible state, a bidirectional conductible state, or a unidirectional conductible state; and wherein switching from the second state to the first state comprises:
based on the second and third semiconductor devices each being in a unidirectional conductible state or a bidirectional conductible state, controlling the second controllable switch and the third controllable switch to be opened; and
based on the second controllable switch and the third controllable switch having been opened, and based on the second and third semiconductor devices each being in a unidirectional conductible state, controlling the first controllable switch to be closed.

18. The voltage regulation system according to claim 17, wherein the voltage regulation system is part of a charging system.

19. The voltage regulation system according to claim 18, wherein the charging system is part of a charging pile.

20. A voltage regulation system, comprising:
a first direct current-direct current (DC/DC) converter;
a second DC/DC converter;
a first controllable switch;
a second controllable switch;
a third controllable switch;
a first semiconductor device, wherein the first semiconductor device comprises at least one of a metal-oxide semiconductor field-effect (MOS) transistor, an insulated gate bipolar transistor (IGBT), or a silicon controlled rectifier (SCR);
a second semiconductor device, wherein the second semiconductor device comprises at least one of a diode, a MOS transistor, an IGBT transistor, or an SCR; and
a third semiconductor device, wherein the third semiconductor device comprises at least one of a diode, a MOS transistor, an IGBT transistor, or an SCR;
wherein an output negative terminal of the first DC/DC converter is connected to an output positive terminal of the second DC/DC converter via the first controllable switch;
wherein an output positive terminal of the first DC/DC converter is connected to the output positive terminal of the second DC/DC converter via the second controllable switch, and the output negative terminal of the first DC/DC converter is connected to an output negative terminal of the second DC/DC converter via the third controllable switch; and
wherein the first semiconductor device is connected in parallel between two terminals of the first controllable switch, the second semiconductor device is connected in parallel between two terminals of the second controllable switch, and the third semiconductor device is connected in parallel between two terminals of the third controllable switch;
wherein the voltage regulation system further comprises a processor configured to switch the voltage regulation system between a first state in which the first and second DC/DC converters are connected in series and a second state in which the first and second DC/DC converters are connected in parallel;
wherein in the first state:
the first controllable switch is in a closed state,
the second and third controllable switches are in an open state,
a drive of the first semiconductor device is in a turn-on state or a turn-off state, and
the second semiconductor device and the third semiconductor device are in a non-conductible state or a unidirectional conductible state; and wherein in the second state:
the second controllable switch and the third controllable switch are in a closed state,
the first controllable switch is in an opened state,
the drive of the first semiconductor device is in a turn-off state, and
the second and third semiconductor devices are each in a non-conductible state, a bidirectional conductible state, or a unidirectional conductible state; and wherein switching from the first state to the second state comprises:
based on the drive of the first semiconductor device being in a turn-on state, controlling the first controllable switch to be opened;
based on the first controllable switch having been opened, and the second semiconductor device and the third semiconductor device being in a unidirectional conductible state, controlling the drive of the first semiconductor device to be turned off; and
after the drive of the first semiconductor device is turned off, controlling the second and third controllable switches to be closed.

21. The system according to claim 20, wherein switching from the second state to the first state comprises:
based on the second and third semiconductor devices each being in a unidirectional conductible state or a bidirectional conductible state, controlling the second controllable switch and the third controllable switch to be opened;
based on the second controllable switch and the third controllable switch having been opened, and based on the second and third semiconductor devices each being in a unidirectional conductible state, controlling the drive of the first semiconductor device module to be turned on; and
after the drive of the first semiconductor device is turned on, controlling the first controllable switch to be closed.

22. The voltage regulation system according to claim 20, wherein the first semiconductor device comprises a MOS transistor or an IGBT transistor, an anode of a diode in the MOS transistor or the IGBT transistor is connected to the output negative terminal of the first DC/DC converter, and a cathode of the diode in the MOS transistor or the IGBT transistor is connected to the output positive terminal of the second DC/DC converter; or
wherein the first semiconductor device comprises an SCR, an anode of the SCR is connected to the output negative terminal of the first DC/DC converter, and a cathode of the SCR is connected to the output positive terminal of the second DC/DC converter.

* * * * *